United States Patent
Katsuyama et al.

(10) Patent No.: US 11,307,405 B2
(45) Date of Patent: Apr. 19, 2022

(54) IMAGE GENERATING DEVICE AND IMAGE GENERATING METHOD FOR DETECTING POSITION OF PUPIL

(71) Applicant: University of Fukui, Fukui (JP)

(72) Inventors: Toshio Katsuyama, Fukui (JP); Shoji Yamada, Fukui (JP)

(73) Assignee: UNIVERSITY OF FUKUI, Fukui (JP)

( * ) Notice: Subject to any disclaimer, the term of this patent is extended or adjusted under 35 U.S.C. 154(b) by 232 days.

(21) Appl. No.: 16/589,661

(22) Filed: Oct. 1, 2019

(65) Prior Publication Data

US 2020/0033590 A1 Jan. 30, 2020

Related U.S. Application Data

(63) Continuation of application No. PCT/JP2018/006693, filed on Feb. 23, 2018.

(30) Foreign Application Priority Data

Apr. 4, 2017 (JP) .............................. JP2017-074819

(51) Int. Cl.
*G02B 26/10* (2006.01)
*G02B 26/12* (2006.01)
*G02B 27/01* (2006.01)

(52) U.S. Cl.
CPC ......... *G02B 26/101* (2013.01); *G02B 26/123* (2013.01); *G02B 27/0172* (2013.01);
(Continued)

(58) Field of Classification Search
None
See application file for complete search history.

(56) References Cited

U.S. PATENT DOCUMENTS

2007/0159599 A1 7/2007 Yamada
2010/0097580 A1 4/2010 Yamamoto et al.
(Continued)

FOREIGN PATENT DOCUMENTS

| CN | 101589329 A | 11/2009 |
| JP | 2006-58505 A | 3/2006 |

(Continued)

OTHER PUBLICATIONS

Office Action dated Jan. 26, 2021, issued in counterpart CN Application No. 201880023356.3, with English translation. (17 pages).

(Continued)

*Primary Examiner* — Jennifer D. Carruth
(74) *Attorney, Agent, or Firm* — WHDA, LLP

(57) ABSTRACT

This invention is provided with: a light source; a light scanning mirror; a measurement mechanism for measuring a change in the intensity of light reflected from an eyeball as time elapses through the scanning of at least a surface of the pupil with a light beam by means of the light scanning mirror; a sampling mechanism for sampling the intensity of light reflected from the pupil from the measured change in the intensity of the reflected light as time elapses; and a mechanism for detecting the size and the position of the pupil by synchronizing the sampled intensity of light reflected from the pupil, and the scanning time during which the surface of the eyeball is scanned; and an image generating mechanism for forming an image on the retina of the eyeball by projecting a light beam for generating an image onto the pupil in the detected position while scanning.

18 Claims, 25 Drawing Sheets

(52) U.S. Cl.
CPC .. *G02B 27/0176* (2013.01); *G02B 2027/0174* (2013.01); *G02B 2027/0178* (2013.01)

(56) References Cited

U.S. PATENT DOCUMENTS

| | | | |
|---|---|---|---|
| 2012/0068609 A1 | 3/2012 | Ide et al. | |
| 2016/0238845 A1* | 8/2016 | Alexander | G02B 27/12 |
| 2016/0349514 A1* | 12/2016 | Alexander | G06F 3/013 |
| 2017/0115483 A1* | 4/2017 | Aleem | G02B 27/0093 |
| 2017/0146744 A1 | 5/2017 | Katsuyama et al. | |
| 2017/0303365 A1* | 10/2017 | Chen | H05B 45/20 |
| 2018/0164595 A1 | 6/2018 | Arakawa et al. | |
| 2018/0184059 A1 | 6/2018 | Arakawa et al. | |
| 2019/0041634 A1* | 2/2019 | Popovich | G02B 6/0035 |
| 2019/0333480 A1* | 10/2019 | Lang | G02B 27/017 |
| 2021/0216146 A1* | 7/2021 | Burns | G02B 27/0172 |

FOREIGN PATENT DOCUMENTS

| | | |
|---|---|---|
| JP | 2010-102215 A | 5/2010 |
| JP | 5294283 B2 | 9/2013 |
| JP | 5817022 B2 | 11/2015 |
| JP | 2017-9986 A | 1/2017 |
| JP | 2017-9992 A | 1/2017 |
| WO | 2009/066475 A1 | 5/2009 |
| WO | 2015/170505 A1 | 11/2015 |

OTHER PUBLICATIONS

Office Action dated Apr. 22, 2021, issued in counterpart TW Application No. 107106092, with English Translation. (12 pages).
Written Opinion dated May 22, 2018, issued in counterpart application No. PCT/JP2018/006693, with English translation. (10 pages).
International Search Report dated May 22, 2018, issued in counterpart International Application No. PCT/JP2018/006693, with English Translation. (3 pages).
"The Journal of the Institute of Image Information and Television Engineers", (2011), vol. 65, No. 6, pp. 758-763. with Partial Translation. Cited in Specification. (8 pages).
Office Action dated Jun. 30, 2021, issued in counterpart CN application No. 201880023356.3, with English translation. (23 pages).

* cited by examiner

RANGE OF AN IMAGE GENERATED ON THE RETINA

IMAGE GENERATING DEVICE AND IMAGE GENERATING METHOD FOR DETECTING POSITION OF PUPIL

CROSS-REFERENCE TO RELATED APPLICATION

This application is a continuation of International Application No. PCT/JP2018/006693, filed on Feb. 23, 2018, herein incorporated by reference. Further, this application is based upon and claims the benefit of priority from the prior Japanese Patent Application No. 2017-074819, filed on Apr. 4, 2017, the entire contents of which are incorporated herein by reference.

FIELD

The present invention relates to an image generating device and an image generating method, and in particular to a configuration for guiding a scanning light beam in an eyeglass-type retina scanning display to a pupil of which the position is changed.

BACKGROUND

Light beam projection devices in various forms have been known as a conventional device for scanning with and projecting a light beam such as a laser beam. From among these, a three primary color light beam projection device where semiconductor lasers and light waveguide type multiplexers are combined is characterized in that the device can be compact and of which the power can be low, and thus has been is applied to a laser beam scanning type color imaging projection device (see Patent Literature 1, Patent Literature 2 and Patent Literature 3).

In the case where scanning is carried out with a laser beam in such a device, the position of a pupil causes a problem for which a pupil tracking method has been proposed (see Patent Literature 4). In this proposal, a light beam for an image that has been emitted from a light source is projected in a first surface region of an eye so as to be projected on the retina of the user, and a light beam for detection that has been emitted from a light source is projected in a second surface region that is away from the first surface region of the eye of the user so that the light beam for detection that has been reflected from the eye of the user is detected, and thereby at least either the light source or the optical system can be controlled on the basis of the reflected light that has been detected, and thus, it has been proposed to miniaturize the image projection device.

In order to suppress the deterioration of the image quality and to prevent the device from being scaled up in the configuration in Patent Literature 4, it has been proposed that the emission of a light beam for an image is started on the basis of the angle at which the first mirror that oscillates in the main scanning direction swings, and after that, a light beam for an image and a light beam for detection are emitted from a light source in accordance with a predetermined constant timing (see Patent Literature 5).

That is to say, the timing in accordance with which the emission of a light beam for an image that is to be scanned for the first time in an image range is started is determined with the angle at which the first mirror swings in the main scanning direction being the reference. After the completion of the emission of a light beam for an image of which the emission has been started in accordance with the timing that has been determined with the angle at which the first mirror swings being the reference, a light beam for an image in the returning leg of the reciprocating oscillation of the first mirror and a light beam for an image in the outgoing leg are emitted repeatedly. These repetitive emissions of light beams for an image are based on the elapsed time from the start of the emission of a light beam for an image of which the emission was started with the angle at which the first mirror swings being the reference.

Many of those who cannot freely move any of the muscles of the body in spite of the normal mental activity, such as those who are suffering from amyotrophic lateral sclerosis, can move their eyeballs normally. Thus, a study has been conducted for detecting the area at which such a person stares by detecting his or her line of sight so that the result can be applied to a system for aiding such a handicapped person by making communication with such a person smooth.

It has also been proposed that images of the face of a driver be taken in order to monitor the awareness and attention of the person who is driving.

In the detection of the position of a pupil in accordance with these conventional methods, the face of the user is irradiated with light from an infrared LED, an image of the eyes of the user is taken by a camera that can sense the infrared rays, and the position on the cornea from which the infrared rays are reflected (reflection on the cornea) is used as the reference point, and thus, the user's eyeline is detected on the basis of the position of the pupil relative to the position on the cornea from which the infrared rays are reflected.

CITATION LIST

Patent Literature

Patent Literature 1: Japanese Patent No. 5294283
Patent Literature 2: Japanese Patent No. 5817022
Patent Literature 3: International Publication Pamphlet No. 2015/170505
Patent Literature 4: Japanese Laid-open Patent Publication No. 2017-009986
Patent Literature 5: Japanese Laid-open Patent Publication No. 2017-009992

Non-Patent Literature

Non-Patent Literature 1: The Journal of the Institute of Image Information and Television Engineers, Vol. 65, No. 6, pp. 758-763 (2011)

SUMMARY

In the case of Patent Literature 4, the position of a pupil is detected in accordance with a predetermined time during raster scanning, and a light beam for generating an image is emitted in accordance with a predetermined time that corresponds to the detection, and therefore, such problems arise that the operation for emitting a light beam becomes complicated, and at the same time, the precision for detecting the position is lowered. That is to say, in Patent Literature 4, a light beam for an image that has been emitted from one light source is projected in a first surface region (pupil) of an eye of the user so as to be projected on the retina of a user, whereas a visible light beam for detection that has been emitted from the same light source is projected in a predetermined position in a second surface region (iris) that is away from the first surface region of the eye of the user so as not to be projected in the pupil.

In the case of Patent Literature 5, such a problem arises that the control of the timing in accordance with which a light beam for an image and a light beam for detection are emitted becomes complicated.

In the conventional method for detecting the position of a pupil, an imaging device for taking an image of the eyes of the user is indispensable, and such a problem arises that the device is large.

Accordingly, an object of the present invention is to detect the position of a pupil more easily.

In accordance with one aspect of the invention, an image generating device comprise: a light source; a light scanning mirror for scanning with light from the light source; a measurement mechanism for measuring a change in the intensity of light reflected from an eyeball as time elapses through the scanning of at least a surface of the pupil with a light beam by means of the light scanning mirror; a sampling mechanism for sampling the intensity of light reflected from the pupil from the measured change in the intensity of the reflected light as time elapses; and a mechanism for detecting the size and the position of the pupil by synchronizing the sampled intensity of light reflected from the pupil, and the scanning time during which the surface of the eyeball is scanned; and an image generating mechanism for forming an image on the retina of the eyeball by projecting a beam for generating an image onto the pupil in the detected position while scanning.

In accordance with another aspect of the invention, an image generating method is provided with the steps of: scanning a surface of at least the pupil with a light beam; measuring a change in the intensity of light reflected from the pupil as time elapses; sampling the intensity of light reflected from the pupil from the measured change in the intensity of the reflected light as time elapses; detecting the size and the position of the pupil by synchronizing the sampled intensity of light reflected from the pupil and the scanning time during which the surface of the eyeball is scanned; and after that projecting an image while scanning the pupil with a light beam for generating an image in the detected position of the pupil so as to form the image on the retina of the eyeball.

According to one aspect of the invention, it becomes possible to detect the position of a pupil more easily. As a result, the position of a pupil can be precisely irradiated with a beam for an image when an image is generated, and consequently, an image can be projected on a retina without fail so that a precise image can be gained.

DESCRIPTION OF EMBODIMENTS

Figure 1:
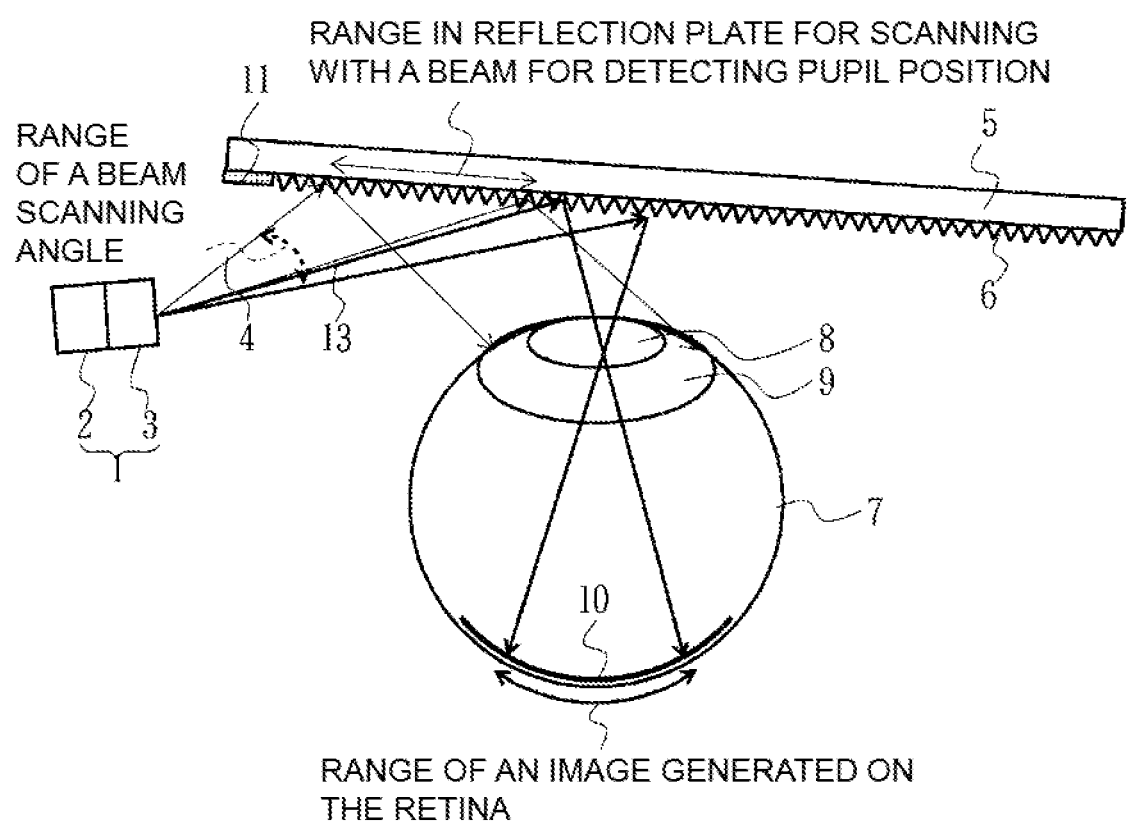
FIG. 1 is a schematic diagram illustrating the configuration of the image generating device according to an embodiment of the present invention.
Figure 2A:
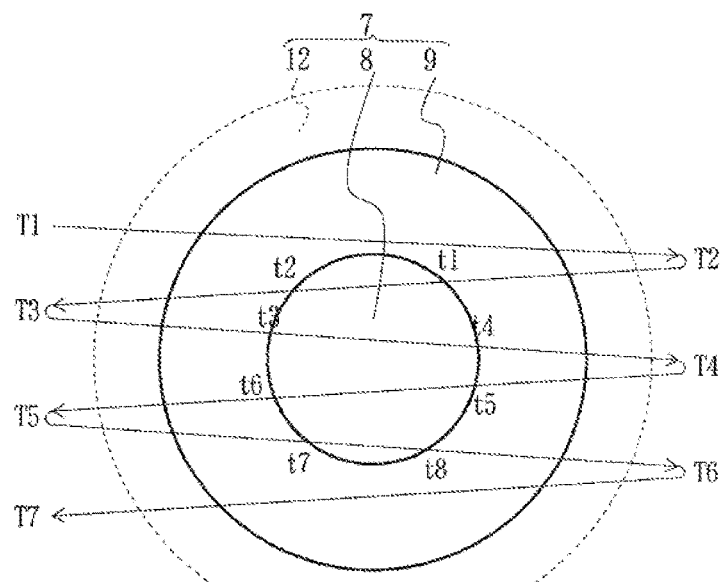
FIGS. 2A and 2B are a diagram and a graph for illustrating the image generating method according to an embodiment of the present invention.
Figure 2B:
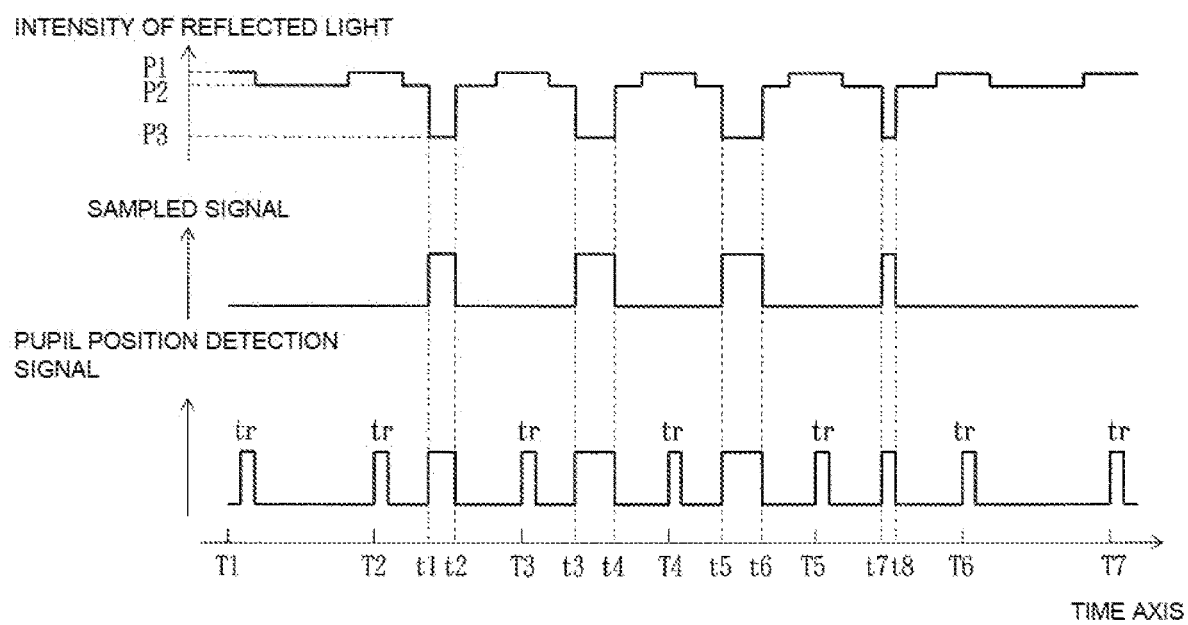

The image generating device and the image generating method according to an embodiment of the present invention are described in reference to FIGS. 1 to 2B. FIG. 1 is a schematic diagram illustrating the configuration of the image generating device according to an embodiment of the present invention, which is provided with a pupil position detection mechanism and an image generation mechanism. The pupil position detection mechanism is provided with: a light source 2; a light scanning mirror 3 for scanning light from the light source 2; a reflection member 6 for reflecting the light beam 4 that has been scanned by the light scanning mirror 3 towards an eyeball 7 that includes a pupil 8 and an iris 9; a measurement mechanism 11 for scanning the surface of the eyeball 7 with the light beam 4 that has been reflected from the reflection member 6 and measuring a change in the intensity of the light reflected from the eyeball 7 as time elapses; a sampling mechanism (not shown) for sampling the intensity of the light reflected from the pupil 8 from the measured change in the intensity of the reflected light as time elapses; and a mechanism (not shown) for detecting the size and the position of the pupil 8 by synchronizing the sampled intensity of light reflected from the pupil 8 and the scanning time during which the surface of the eyeball 7 is scanned. Here, 10 in the figure is a retina.

This pupil position detection mechanism can be combined with an image generating mechanism for forming an image on the retina 10 in the eyeball 7 by projecting a light beam for generating an image in the pupil 8 at the detected position while scanning in order to form a wearable image generating device. In this case, miniaturization becomes possible by allowing the light source for a light beam 13 for generating an image in the image generating mechanism, the light scanning mirror and the reflection member to function as the light source 2 in the pupil position detection device, the light scanning mirror 3 and the reflection member 6 in the configuration. Though the surface of the eyeball 7 that includes the pupil 8 and the iris 9 is scanned in this device, the pupil 8 may be partially scanned, and it is possible to estimate the position and the size of the pupil 8 in the case where the pupil 8 can be scanned even partially.

In this case, the light source 2 and the light scanning mirror 3 may be integrated so that the optical engine 1 can be formed. In addition, a holographic reflection plate, for example, is used as the reflection member 6. The holographic reflection plate is fixed to a support member 5 such as a temple or a lens of eyeglasses. Furthermore, this sampling mechanism and the mechanism for detecting the size and the position of the pupil 8 are formed of a processing circuit provided inside a CPU or the like in the rear stage of the output from the measurement mechanism 11. Alternatively, in the case where the scanning for pupil position detection and the scanning for image generation are carried out with time division, a light path switching element such as a prism mirror, the total reflection/transmission element or an electro-optical element may be provided on the output side of the light scanning mirror 3. The provision of the light path switching element makes the light scanning mirror 3 with a wide scanning angle unnecessary, and thus, the scanning angle range can be effectively used.

The location at which the measurement mechanism 11 is arranged is not particularly limited as long as it is a location where reflected light can be gained. The measurement mechanism 11 may be provided on the eyeglass frame or the eyeglass lens, or the measurement mechanism 11 may be directly mounted onto the optical engine 1. In addition, the light reflected from the eyeball 7 may be detected as light that is returning to the optical engine 1. In this case, the returning light may be detected as a change in the current/voltage that is caused by the returning light of the light beam 13 for generating an image of light of three primary colors without another measuring mechanism 11 being mounted. Furthermore, a waveguide device may be provided vis-a-vis the measurement mechanism 11. For example, an optical system may be provided in such a manner that a detector is arranged after the reflected light has returned to the optical engine 1

The holographic reflection plate may be directly irradiated with the light beam 4 with which the surface of the eyeball 7 is scanned. Alternatively, the light beam 4 with which the surface of the eyeball 7 is scanned propagates through the inside of the rim of the eyeglasses or the inside of the lens of the eyeglasses so as to be reflected from the holographic reflection plate that is provided on the surface of the rim of the eyeglasses or the lens of the eyeglasses on the side opposite the eyeball 8.

Though one or more types of semiconductor laser chips from among a blue semiconductor laser chip, a green semiconductor laser chip, a red semiconductor laser chip, a yellow semiconductor laser chip, an infrared semiconductor laser chip and an ultraviolet semiconductor laser chip can be used as the light source 2, an LED (light emitting diode) may be used instead of a semiconductor laser. Here, the human eyes do not sense the infrared rays, and therefore, images formed of three primary color light beams are not effective, and therefore, an emitter of infrared rays is desirable as the light source for detecting the position of a pupil.

FIGS. 2A and 2B are a diagram and a graph illustrating the image generating method according to an embodiment of the present invention. FIG. 2A is a diagram illustrating the scanning state of a light beam, and FIG. 2B is a graph illustrating the intensity of the reflected light, a sampled signal and a pupil position detection signal. As illustrated in FIG. 2A, the surface of the eyeball 7 that includes a pupil 8 and an iris 9 is scanned with a light beam 4, the change in the intensity of the light reflected from the eyeball 7 is measured as time elapses, the intensity of the light reflected from the pupil 8 is sampled from the measured change in the intensity of the reflected light as time elapses, and the size and the position of the pupil 8 are detected by synchronizing the sampled intensity of the light reflected from the pupil 8 and the scanning time during which the surface of the eyeball 7 is scanned. In the case in FIGS. 2A and 2B, the scanning for detecting the position of the pupil and the scanning for generating an image are separated timewise; however, the scanning for detecting the position of the pupil and the scanning for generating an image may be carried out at the same time as sequential scanning.

In this case, the optical system is adjusted in such a manner that the pupil 8, the iris 9 and the white part of the eye 12 around these are irradiated with the light beam 4 for detecting the position of the pupil in order to track the pupil while scanning across these portions. In addition, the reflected light is detected by the measurement mechanism (11) such as a photodetector, and the amount of light thereof is detected as an electrical signal. In FIG. 2A, a light path starting from T1 and reaching T7 is illustrated for the purpose of simplicity.

The upper part in FIG. 2B illustrates the thus-gained change in the electrical signal as time elapses where the lateral axis is a time axis, and T1, T2, T3, T4, T5, T6 and T7 are points of time that respectively correspond to the points at which scanning is returned as illustrated in FIG. 2A. In the signal in the upper part of the graph, the intensities of the reflected light P1, P2 and P3 are respectively a signal from the white of the eye 12, a signal from the iris 9 and a signal from the pupil 8. Thus, it is seen that the light reflected from the white of the eye 12 is the most intense, the light reflected from the iris 9 is the second most intense, and the light reflected from the pupil 8 is the least intense. It is considered that the light reflected from the pupil 8 is the least intense because the light beam 4 enters into the eyeball, which prevents the reflection.

The middle part in FIG. 2B illustrates a signal that is gained by sampling the time zones from which the signal P3 that corresponds to the reflection from the pupil 8 is gained from among the above-described signals. This sampling may be carried out by using a signal level selector circuit or the like that recognizes and samples only the time zones where the signal intensity is the smallest. The time zones during which the signal P3 is gained are the zones between t1 and t2, between t3 and t4, between t5 and t6, and between t7 and t8. It can be seen that the pupil 8 is irradiated with the light beam 4 only during these time zones.

In order to detect the position of the pupil 8 from these signals, a short signal is generated as a trigger tr at each point in time that corresponds to the point at which the scanning is returned as the tr that is illustrated in the lower part of the graph in FIG. 2B, the time difference vis-à-vis the trigger is measured, and the calculation is carried out backwards from the time difference so as to determine the position of the pupil 8. In addition, the intervals between t1 and t2, between t3 and t4, between t5 and t6, and between t7 and t8 are compared so that the position of the pupil 8 in the upward and downward directions in the figure can be detected. Here, the pupil 8, the iris 9 and the white of the eye 12 around these are irradiated with the light beam 4 for detecting the position of the pupil while scanning across these; however, at least the pupil 8 may be partially scanned, and thereby it becomes possible to estimate the position and the size of the pupil 8.

Accordingly, the position of the pupil can be precisely irradiated with a beam for an image, and as a result, an image can be projected onto a retina without fail so that a precise image can be gained. In the case where it is simply used as a pupil position detection system, the detection of the eyeline for the application to a handicapped person's aid system or the detection of the eyeline at the time of the monitoring of the awareness and the attention of a person who is driving can be made easy without the use of an imaging device or the like. That is to say, contrary to the above-described common technical knowledge in the prior art as in Patent Literature 4, the entire region that covers the pupil 8, the iris 9 and the white of the eye 12 around these is scanned with a visible light beam 4 for detecting the position of a pupil so that the light beam 4 enters into the pupil 8 in the embodiment of the present invention, which thus makes it possible to precisely irradiate the position of a pupil with a beam for an image, unlike the prior art in Patent Literature 4. Here, it is not primarily desirable for the visible light beam 4 for detecting the position of a pupil to enter into the pupil 8, and therefore the output of the light beam 4 is made as low as possible.

When a light beam for generating an image is emitted, the pupil 8 in the detected position of the pupil may be projected with the light beam for generating an image while being scanned so that an image can be formed on the retina 10 of the eyeball 8 after the size and the position of the pupil 8 have been detected in accordance with the above-described pupil position detection method. In the case where the scanning for detecting the position of a pupil and the scanning for generating an image are carried out simultaneously in a sequential scanning, the detected position of the pupil 8 is irradiated with a light beam for generating an image in accordance with the timing t4, t6 during scanning after the pupil position has been detected. Here, the pupil position has not been detected at the point in time of t2, and therefore, the light beam for generating an image is not emitted at this point.

In this process for detecting the size and the position of the pupil 8, the eyeball 7 may be irradiated with a light beam 4 for scanning after pre-setting a plurality of beam spots to be irradiated with a light beam for generating an image so that the light beam for generating an image can be projected onto one of the plurality of beam spots that have been detected as being in proximity to the center position of the pupil 8 while scanning. Here, the beam spots mean the same points that the scanning light beam passes whenever scanning is carried out.

Typically, each beam spot from among the plurality of beam spots may be irradiated with the light beam 13 for generating an image with the angle at which the scanning is carried out with the beam being changed by means of a light scanning mirror 3 in the image generating mechanism.

Alternatively, each beam spot from among the plurality of beam spots may be irradiated with the light beam 13 for generating an image by moving the light scanning mirror in the image generating mechanism in the optical access direction of the light beam from the light source. In this case, the light scanning mirror in the image generating mechanism may be provided with a moving mechanism that is movable in the optical axis direction of the light beam from the light source in the image generating mechanism.

Alternatively, the position on the eyeball 7 that is irradiated with the light beam 13 for generating an image may be continuously changed while being irradiated with the light beam 13 for generating an image in the process for scanning the light beam 13 for generating an image instead of setting a plurality of beam spots so that the light beam 13 for generating an image can be projected onto the beam spot that has been detected as being at the center position of the pupil 8. In this case, the beam spot into which the light beam 13 for generating an image that has been emitted and passed through the pupil 8 converges is positioned inside the eyeball 7.

In any case, a scanning operation is carried out within a preset range of a beam scanning angle, and the light beam for generating an image may be projected onto each beam spot while scanning within the preset range of the beam scanning angle. As a result, the pupil position can be precisely irradiated with a beam for an image, and consequently, an image can be projected on the retina without fail so that a precise image can be gained. As for the blurring in an optical system that may be caused by the mechanical control mechanism when the optical system for scanning is controlled and the consumption of energy for driving the optical system to be controlled, the risk of these can be reduced through the control of the timing according to which the light beam for projecting an image is emitted.

Alternatively, the scanning operation may be carried out on each beam spot in a range that exceeds the preset range of the beam scanning angle so that the above-described light beam for generating an image can be projected onto the beam spot while scanning within the preset range of the beam scanning angle.

Furthermore, the above-described light beam for generating an image may be projected onto each beam spot while scanning in a range that exceeds the preset range of the beam scanning angle.

Example 1

Figure 3:
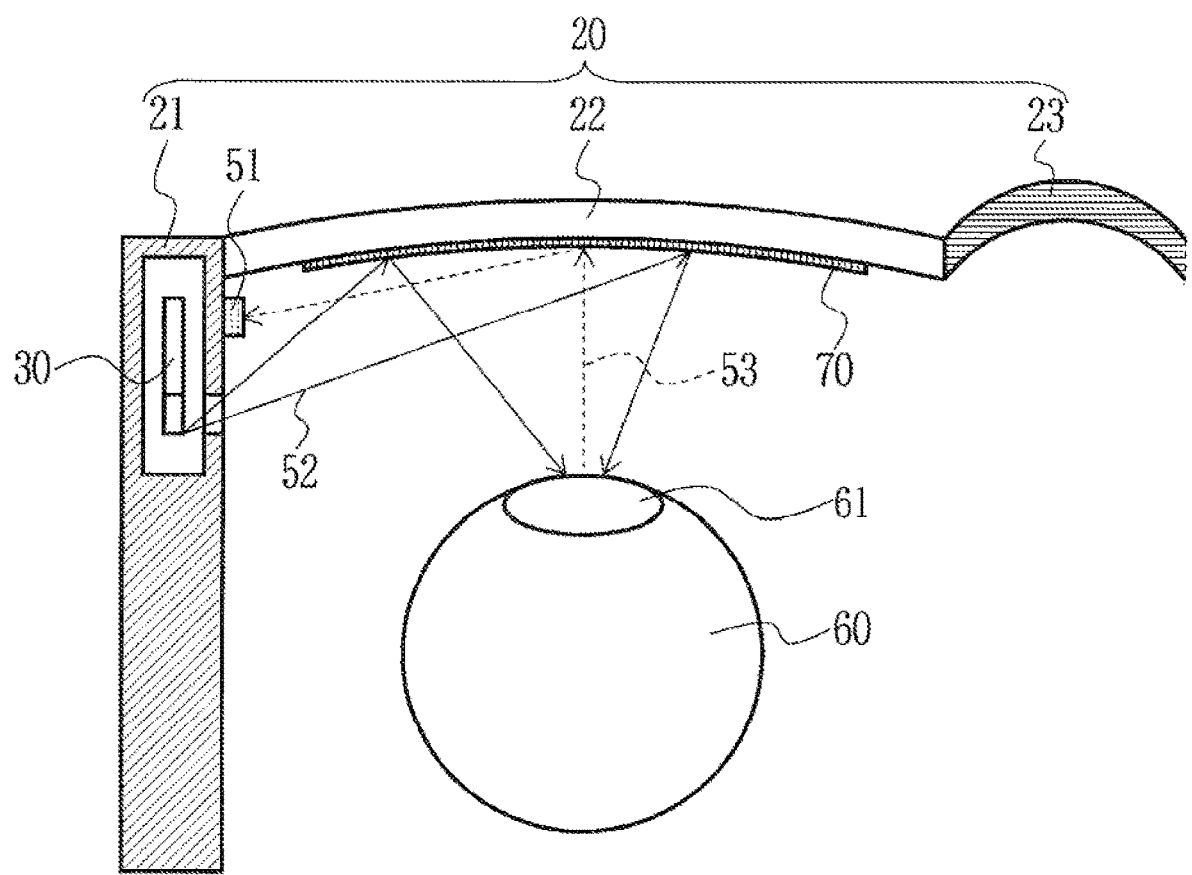
FIG. 3 is a diagram illustrating the configuration of the main portion of the image generating device according to Example 1 of the present invention.

Next, the image generating device according to Example 1 of the present invention is described in reference to FIGS. 3 through 7B. In Example 1 of the present invention, the scanning for detecting the pupil position and the scanning for generating an image are separately carried out timewise. FIG. 3 is a diagram illustrating the configuration of the main portion of the image generating device according to Example 1 of the present invention. Eyeglasses 20 are formed of a temple 21, an eyeglasses lens 22 and a bridge 23 where in some cases the outer peripheral portion of the eyeglasses lens 22 is supported by a rim (not shown). An optical engine 30 made of a light source and a light scanning mirror is housed inside the temple 21 of the eyeglasses 20, and at the same time, a photodetector 51 is attached in the vicinity thereof. A holographic reflection plate 70 is pasted to a portion of the eyeglasses lens 22.

A scanning light beam 52 emitted from the optical engine 30 is reflected from the holographic reflection plate 70 for the scanning of the surface of the eyeball 60 that includes a pupil 61, and the reflected light 53 is again reflected from the holographic reflection plate 70 so as to be detected by the photodetector 51. Here, it is desirable for an optical filter through which light with a wavelength that is used for the scanning light beam 52 passes through to be provided in front of the photodetector 51 so that stray light from the outside can be shut out.

Figure 4:
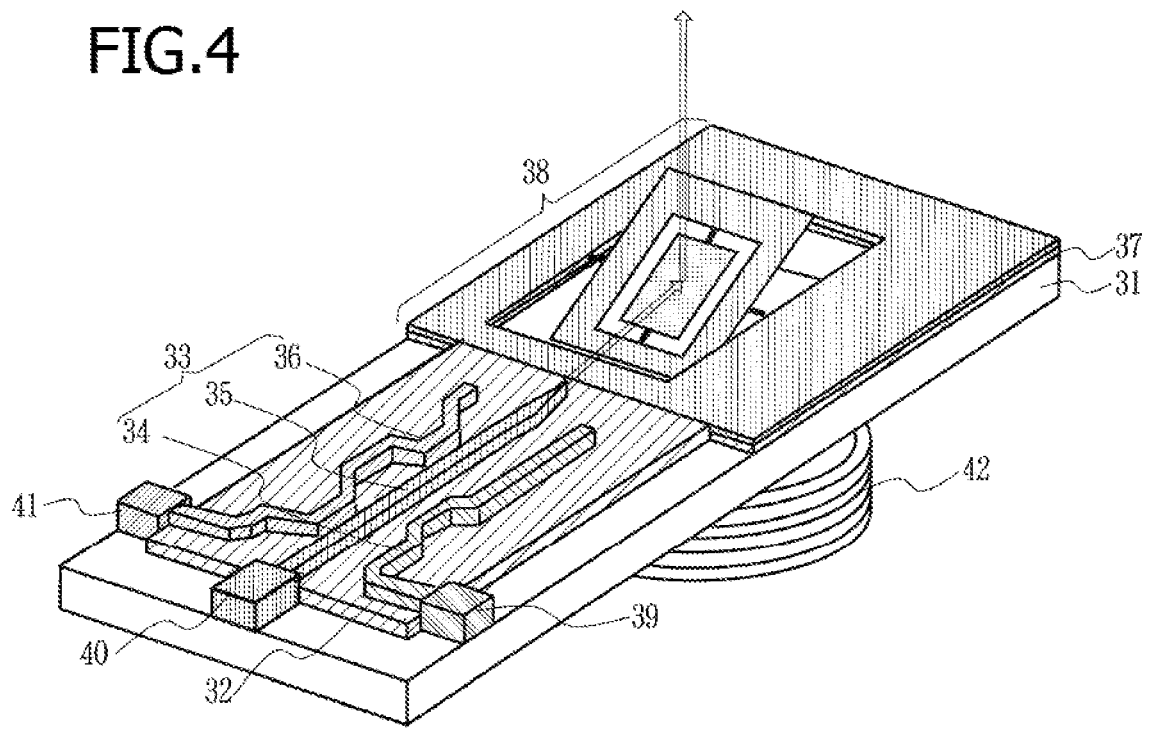
FIG. 4 is a schematic perspective diagram illustrating the optical engine that is used in the image generating device according to Example 1 of the present invention.

FIG. 4 is a schematic perspective diagram illustrating the optical engine that is used in the image generating device according to Example 1 of the present invention. First, an $SiO_2$ film 32 having a thickness of 15 μm is formed on an Si substrate 31 having a thickness of 500 μm in accordance with a flame hydrolysis method. Next, a film of $SiO_2$—$GeO_2$ layers (difference in the refractive index $\Delta n=0.5\%$, where $\Delta n=(n_1-n_2)/n_1$, $n_1$: refractive index of the core and $n_2$: refractive index of the clad) having a thickness of 2 μm is formed on the $SiO_2$ film 32 in accordance with the same flame hydrolysis method. On top of these, light waveguides 34 through 36 having a waveguide width of 2 μm are formed through patterning in accordance with a light exposure method using a contact mask so as to provide an optical multiplexer 33.

Next, an $SiO_2$ film (not shown) having a thickness of 20 μm is formed as an upper clad layer in accordance with the same flame hydrolysis method so as to provide a cover layer that covers the entirety of the patterned light waveguides 34 through 36. Here, it is necessary to bend the light entrance portions of the patterned light waveguide 34 for red light and the patterned light waveguide 36 for blue light at a right angle, and therefore, a deep trench having a depth of 30 μm is created in the bent portions through etching using a focused ion beam method with Ga so that the guided light is totally reflected from the sidewalls of the trench. Next, the $SiO_2$ film is completely removed through etching except only the region of the optical multiplexer 33 so as to leave the Si substrate 31 in an exposed state.

Next, a two-dimensional light scanning mirror unit 38 having a double frame structure with a rotatable outer frame and a non-rotatable outer frame that are respectively supported by a pair of hinges is formed. As for the basic principle in the manufacturing process thereof, all the processes after magnetization are carried out at a temperature of 200° C. or less in order to prevent the permanent magnet properties of the magnetic thin film that forms the two-dimensional light scanning mirror unit 38 from being erased. Here, 37 in the figure denotes an $SiO_2$ film.

Next, a red semiconductor laser chip 39, a green semiconductor laser chip 40 and a blue semiconductor laser chip 41 are respectively bonded onto the Si substrate 31 so that light can enter into the patterned light guides 34 through 36 respectively. At this time, the Si substrate 31 is etched to a predetermined depth so that the laser emission ends of the red semiconductor laser chip 39, the green semiconductor laser chip 40 and the blue semiconductor laser chip 41 and the positions of the patterned light guides 34 through 36 respectively match.

Next, a solenoid coil 42 for driving the reflection unit of the two-dimensional light scanning mirror device 38 is arranged on the bottom side of the Si substrate 31 and fixed to the Si substrate 31 by means of an adhesive. At this time, the mirror surface of the reflection unit is adjusted to incline at 45° relative to the light beam that is approximately parallel to the main surface of the Si substrate 31 in a state where no light scanning signal is applied to the solenoid coil 42.

Figure 5A:
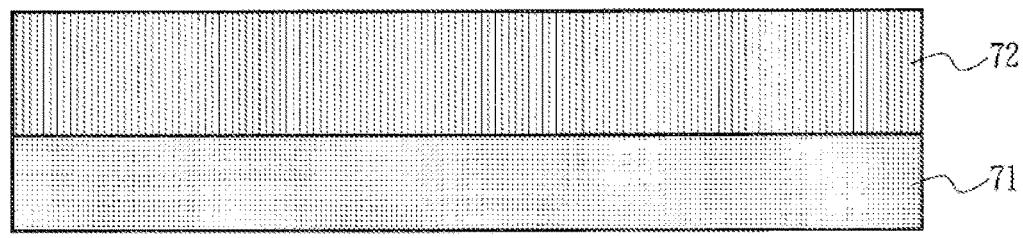
FIGS. 5A, 5B and 5C are diagrams illustrating the method for forming a holographic reflection plate.
Figure 5B:
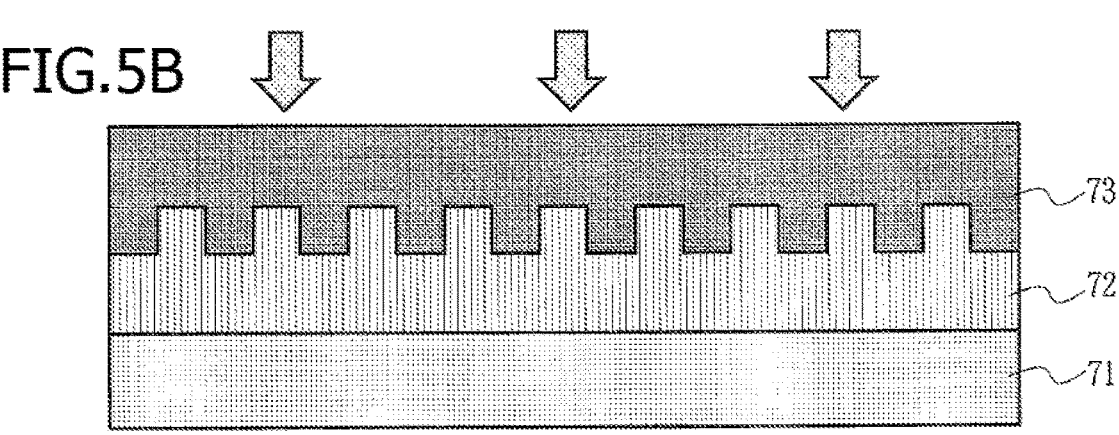
Figure 5C:
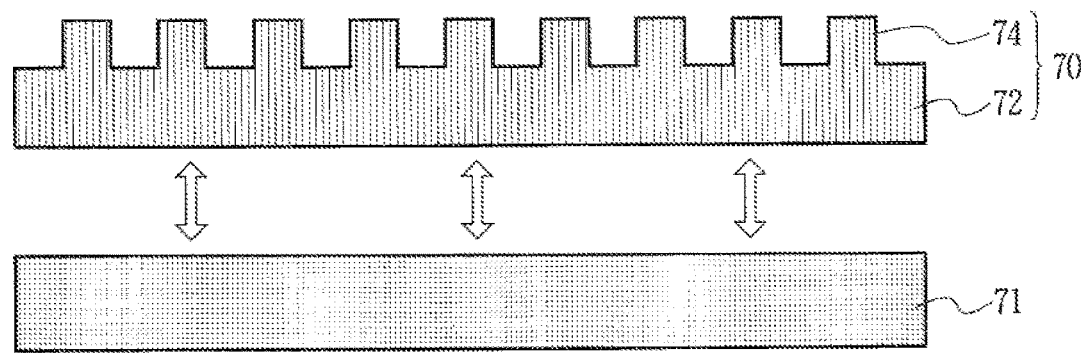

FIGS. 5A through 5C are diagrams illustrating a method for forming a holographic reflection plate. First, as illustrated in FIG. 5A, a transparent plastic film 72 is formed on a substrate 71 that is made of $SiO_2$-based glass or the like having a thickness of approximately 0.5 mm to 10 mm in accordance with a method of application or the like. Next, as illustrated in FIG. 5B, a mold 73 is pressed against the top of the formed plastic film 72, and the temperature of the plastic film 72 is increased to a temperature that is close to the temperature at which the plastic softens. The mold 53 is fabricated with patterned ridges with the spacing that provide a diffraction grating 74 for reflecting the light beam at a designed angle, and thus, this diffraction grating is transferred to the plastic film 72.

Next, as illustrated in FIG. 5C, the plastic film 72 to which the diffraction grating 74 has been transferred is peeled from the substrate 71 so as to provide a holographic reflection plate 70. The holographic reflection plate 70 is pasted to a predetermined portion on the surface on the inner surface of the eyeglasses lens 22. Here, the holographic reflection plate 70 may be pasted to a rim that is not shown. Here, a polycarbonate resin that softens at a temperature of 145° C. is used for the plastic film 72, the temperature to which the plastic film 72 is heated is 140° C., and the applied pressure is 2.0 MPa. Here, the eyeglasses lens may be used as the substrate, and a transparent plastic film for the eyeglasses lens may be provided in such a manner that a diffraction grating is transferred to this plastic film. In this case, the peeling process from the substrate becomes unnecessary.

Figure 6:
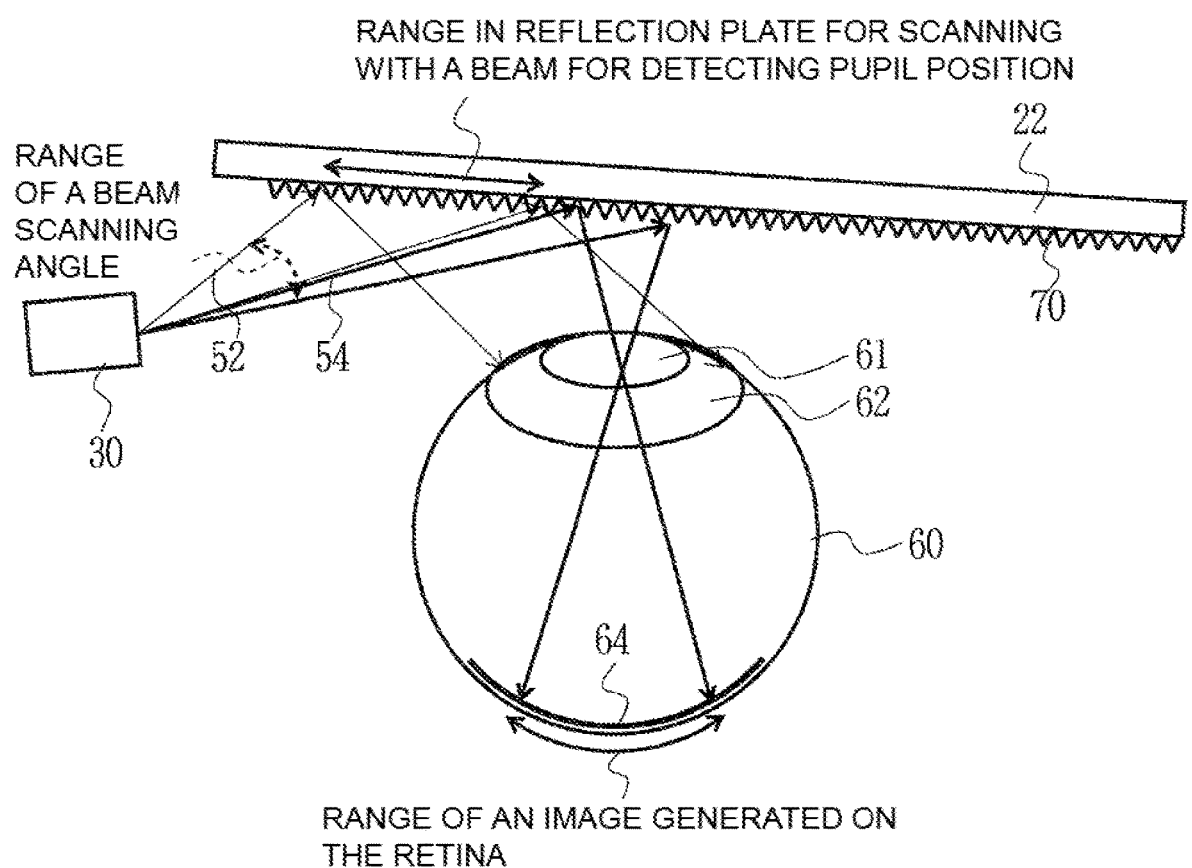
FIG. 6 is a diagram illustrating the state of irradiation with a scanning light beam according to Example 1 of the present invention.

FIG. 6 is a diagram illustrating the state of irradiation with a scanning light beam in Example 1 of the present invention, where the scanning is carried out two-dimensionally; however, this drawing is provided on a plane for the purpose of simplicity. The scanning light beam 52 emitted from the optical engine 30 is reflected from the holographic reflection plate 70 for the scanning of the surface of the eyeball 60 that includes a pupil 61. The reflected light is again reflected from the holographic reflection plate 70 so as to be detected by the photodetector (51) that is attached to the temple of the eyeglasses, and thus, the position of the pupil 61 is detected. The three primary color beam 54 that has been emitted from the same optical engine 30 for scanning is reflected from a holographic reflection plate (not shown), which is formed outside the range of the reflection plate for the scanning light beam 52 for detecting the pupil position in the eyeglasses lens 22, so as to pass through the pupil 61 so that an image is generated on the retina 64 of the eyeball 60.

The scanning of a beam for tracking and detecting a pupil is carried out in a widened range of the scanning angle in accordance with the same timing as the scanning of a beam for generating an image. In this case, a light beam that has been thinned out from among the three primary color light beam 54 for generating an image that is used for the entire scanning can be used for the scanning of a scanning light beam 52 for tracking and detecting a pupil that is actually used for the detection, and thus, the time for running a program for the position analysis and the power consumption can be reduced. Concretely, in the case where the scanning in the lateral (left to right) direction of the scanning of a beam for generating an image is 30 kHz and the scanning in the vertical (upward and downward) direction is 60 Hz, the scanning both in the lateral direction and the vertical direction of the scanning of a beam for tracking and detecting a pupil may be 1 Hz to 100 Hz. Here, it is not originally desirable for visible light that is used for the scanning of a beam for tracking and detecting a pupil to enter into the pupil 61, and therefore, the output of a scanning light beam 52 is made as low as possible at the time of the scanning of a beam for tracking and detecting a pupil.

Figure 7A:
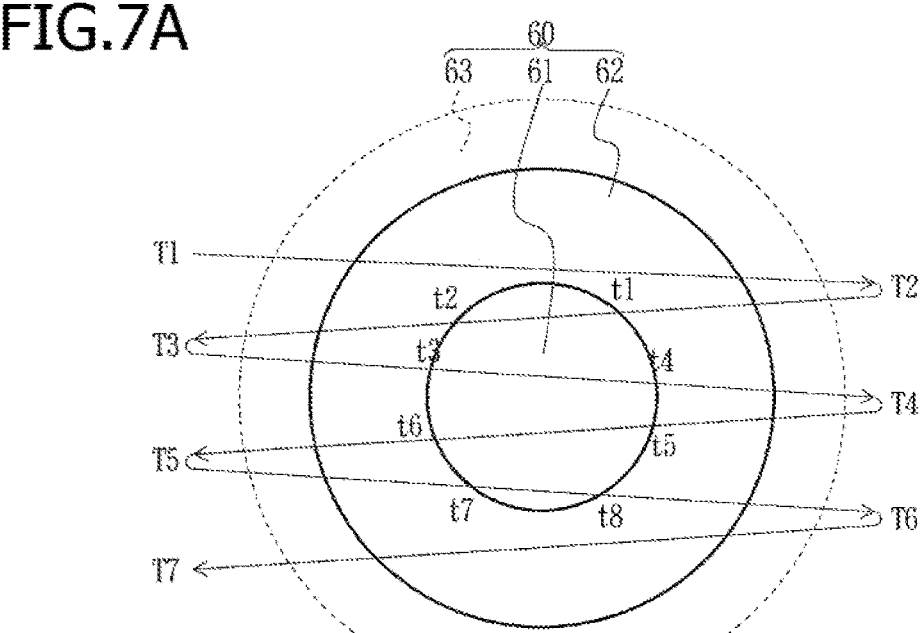
FIGS. 7A and 7B are a diagram and a graph illustrating the image generating method where the image generating device according to Example 1 of the present invention is used.
Figure 7B:
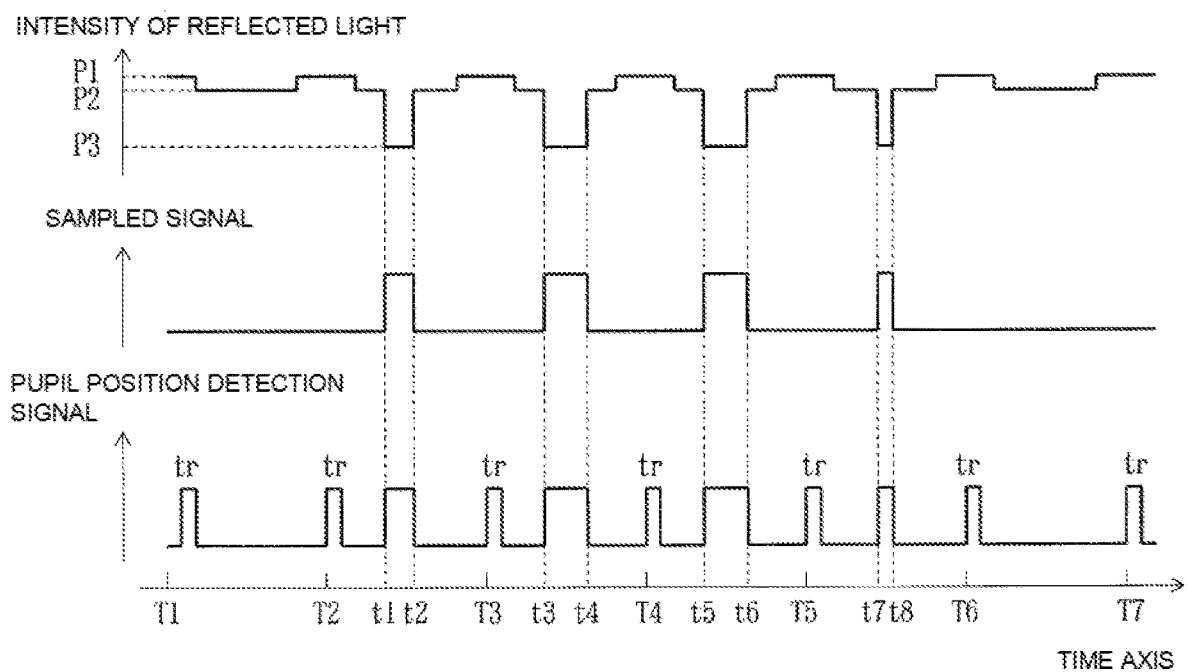

FIGS. 7A and 7B are a diagram and a graph illustrating the image generating method where the image generating device according to Example 1 of the present invention is used. FIG. 7A is a diagram illustrating the pupil position detection method, and FIG. 7B is a graph illustrating the image generating method. As illustrated in FIG. 7A, the pupil 61, the iris 62 and the white of the eye 63 around these are irradiated with a light beam 53 while scanning across these. Here, the size of the pupil is approximately 2.5 mm to 4 mm in the diameter, the width of the scanning of the scanning light beam in the left to right directions is approximately +/−20 mm, and the width of the scanning in the upward and downward directions is approximately +/−12 mm. The scanning width is set in this manner so that the precise position of the pupil 61 can be detected provided that the position of the pupil 61 varies by approximately +/−10 mm in the left to right direction and by approximately +/−5 mm in the upward and downward directions.

As illustrated in the upper part in FIG. 7B, as for the intensity of the reflected light that has been detected by the photodetector 51, the reflected light P1 from the white of the eye 63 is the most intense, the reflected light P2 from the iris 62 is the second most intense, and the reflected light P3 from the pupil 61 is the least intense. The middle portion of FIG. 7B illustrates a signal in the time zones where the signal P3 that has been sampled by using a signal level selector circuit is gained. The time zones where the signal P3 is gained are between t1 and t2, between t3 and t4, between t5 and t6, and between t7 and t8. The pupil 61 is irradiated with the scanning light beam 52 only during these time intervals.

In order to detect the position of the pupil 61 from these signals, like tr illustrated in the lower part of FIG. 7B, a short signal is generated as a trigger in the respective time slots that correspond to the respective points at which the scanning returns, and the time difference vis-à-vis the trigger is measured so that the position of the pupil 61 is determined by backwardly calculating from the time difference. For example, in the beam scanning between T2 and T3, the pupil 61 starts from the amount of change in the position that corresponds to the time between T2 and t1, and the amount of change in the position that corresponds to the time between t1 and t2 corresponds to the width of the pupil 61.

After the precise position of the pupil 61 has been detected, the detected position of the pupil 61 is irradiated with a light beam for generating an image. Here, the size of the spot of the beam for generating an image is made smaller than approximately 4 mm in the diameter.

In Example 1 of the present invention, a scanning light beam is used to detect the pupil position, and therefore, a simple mechanism and method allow the position of the pupil 61 to be detected in approximately real time and with high precision.

Example 2

Figure 8:
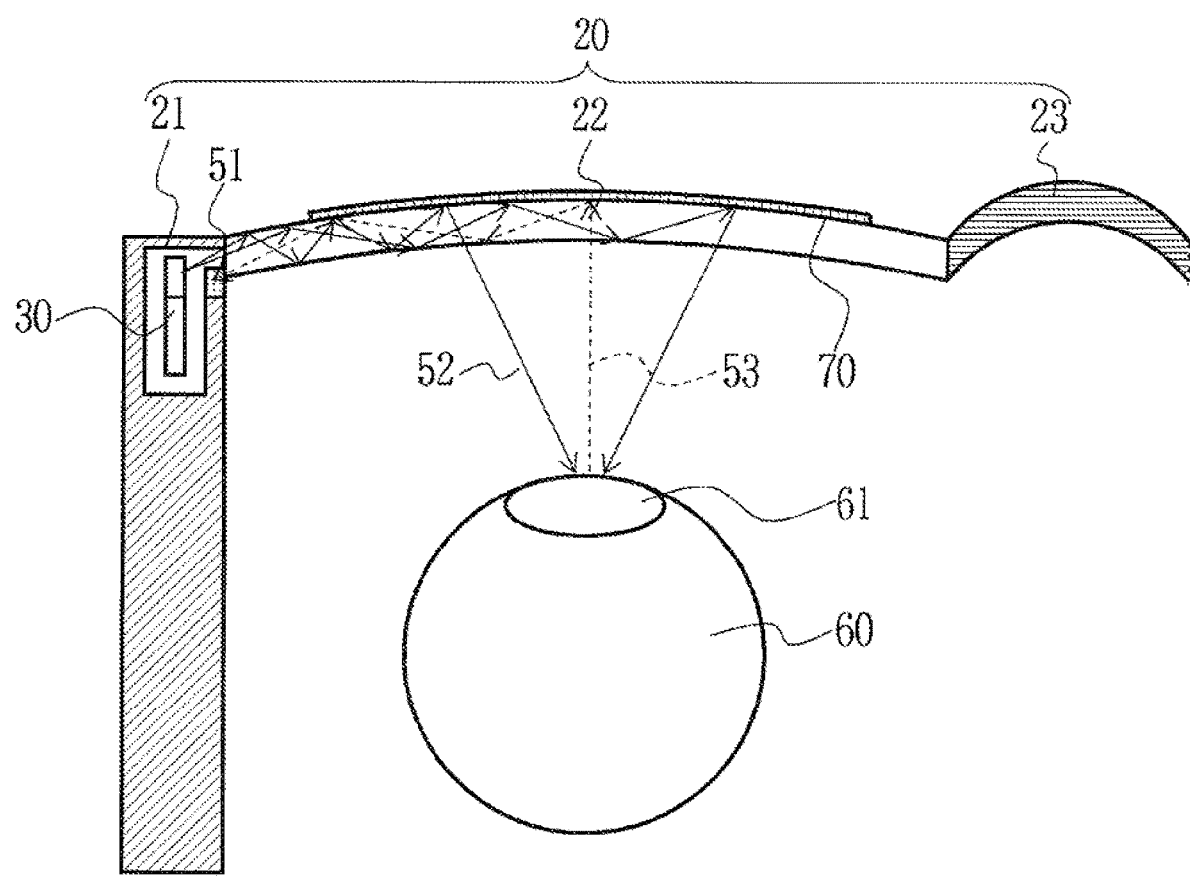
FIG. 8 is a diagram illustrating the configuration of the main portion of the image generating device according to Example 2 of the present invention.

Next, the image generating device according to Example 2 of the present invention is described in reference to FIG. 8. FIG. 8 is a diagram showing the configuration of the main portion of the image generating device according to Example 2 of the present invention. The eyeglasses 20 are formed of a temple 21, an eyeglasses lens 22 and a bridge 23, where in some cases the outer periphery portion of the eyeglasses lens 22 is supported by a rim (not shown). An optical engine 30 made of a light source and a light scanning mirror is housed inside the end portion of the temple 21 of the eyeglasses 20. In addition, a photodetector 51 is attached to an end portion of the eyeglasses lens 22 in Example 2. A holographic reflection plate 70 is pasted to a portion on the surface of the eyeglasses lens 22 on the side opposite the surface that faces the eyeball 60.

The scanning light beam 52 emitted from the optical engine 30 propagates through the eyeglasses lens 22 while repeating the total reflection, and is reflected from the holographic reflection plate 70 for the scanning of the surface of the eyeball 60 that includes a pupil 61. The reflected light is again reflected from the holographic reflection plate 70 so as to propagate through the eyeglasses lens 22 in the opposite direction, and thus is detected by the photodetector 51. In this case as well, it is desirable for an optical filter that allows light with a wavelength to be used for the scanning light beam 52 to pass through to be provided in front of the photodetector 51 so that stray light from the outside can be shut out. Here, the image generating method is the same as in the case of Example 1.

Example 3

Figure 9:
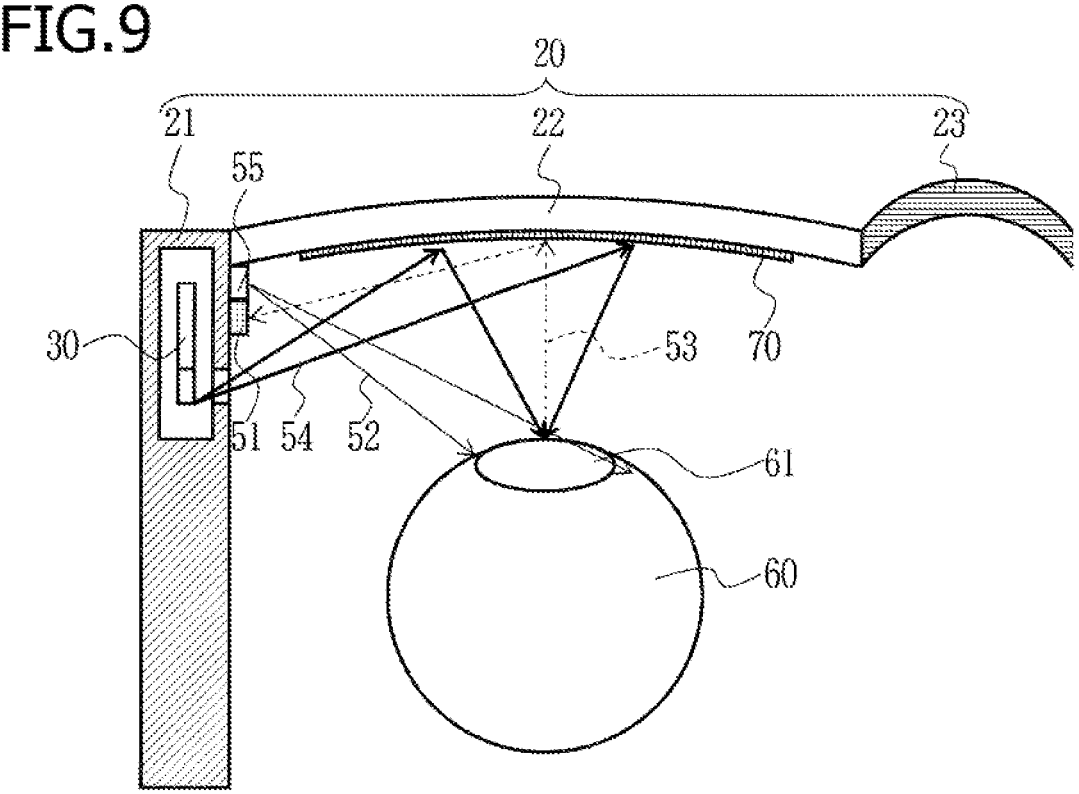
FIG. 9 is a diagram illustrating the configuration of the main portion of the image generating device according to Example 3 of the present invention.
Figure 10:
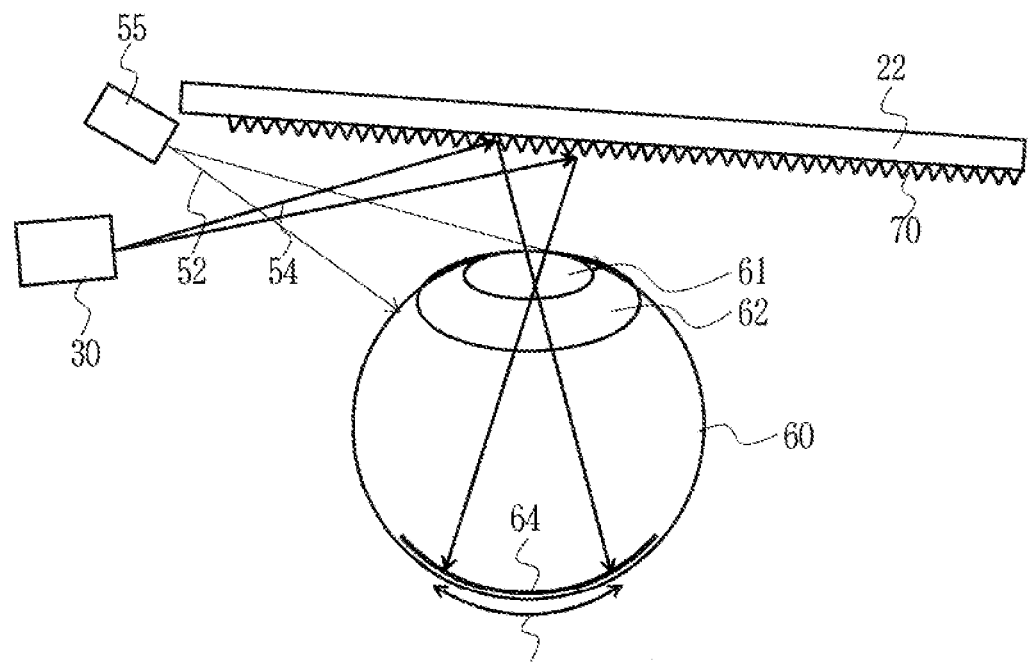
FIG. 10 is a diagram illustrating the state of irradiation with a scanning light beam according to Example 3 of the present invention.

Next, the image generating device according to Example 3 of the present invention is described in reference to FIGS. 9 and 10. FIG. 9 is a diagram illustrating the configuration of the main portion of the image generating device according to Example 3 of the present invention. The eyeglasses 20 are formed of a temple 21, an eyeglasses lens 22 and a bridge 23 where in some cases the outer periphery portion of the eyeglasses lens 22 is supported by a rim (not shown). An optical engine 30 made of a light source and a light scanning mirror is housed inside the end portion of the temple 21 of the eyeglasses 20. In addition, a photodetector 51 is attached to an end portion of the eyeglasses lens 22 in Example 3. In addition, a holographic reflection plate 70 is pasted to a portion of the eyeglasses lens 22, and at the same time, an optical engine 55 for detecting the pupil position is separately attached to the temple 21 of the eyeglasses 20. Here, the optical engine 55 only detects the point of the pupil 61, and therefore, an optical engine 55 having a single light source, for example, having an infrared ray semiconductor laser as a light source, may be used.

FIG. 10 is a diagram illustrating the state of irradiation with a scanning light beam in Example 3 of the present invention. The scanning light beam 52 emitted from the optical engine 55 scans the surface of the eyeball 60 that includes a pupil 61. The reflected light therefrom is reflected from the holographic reflection plate 70 or the like so as to be detected by a photodetector (51). In this case as well, it is desirable for an optical filter that allows light with a wavelength used for the scanning light beam 52 to pass through to be provided in front of the photodetector 51 so that stray light from the outside can be shut out. Here, the image generating method is the same as in the case of Example 1.

Example 4

Figure 11:
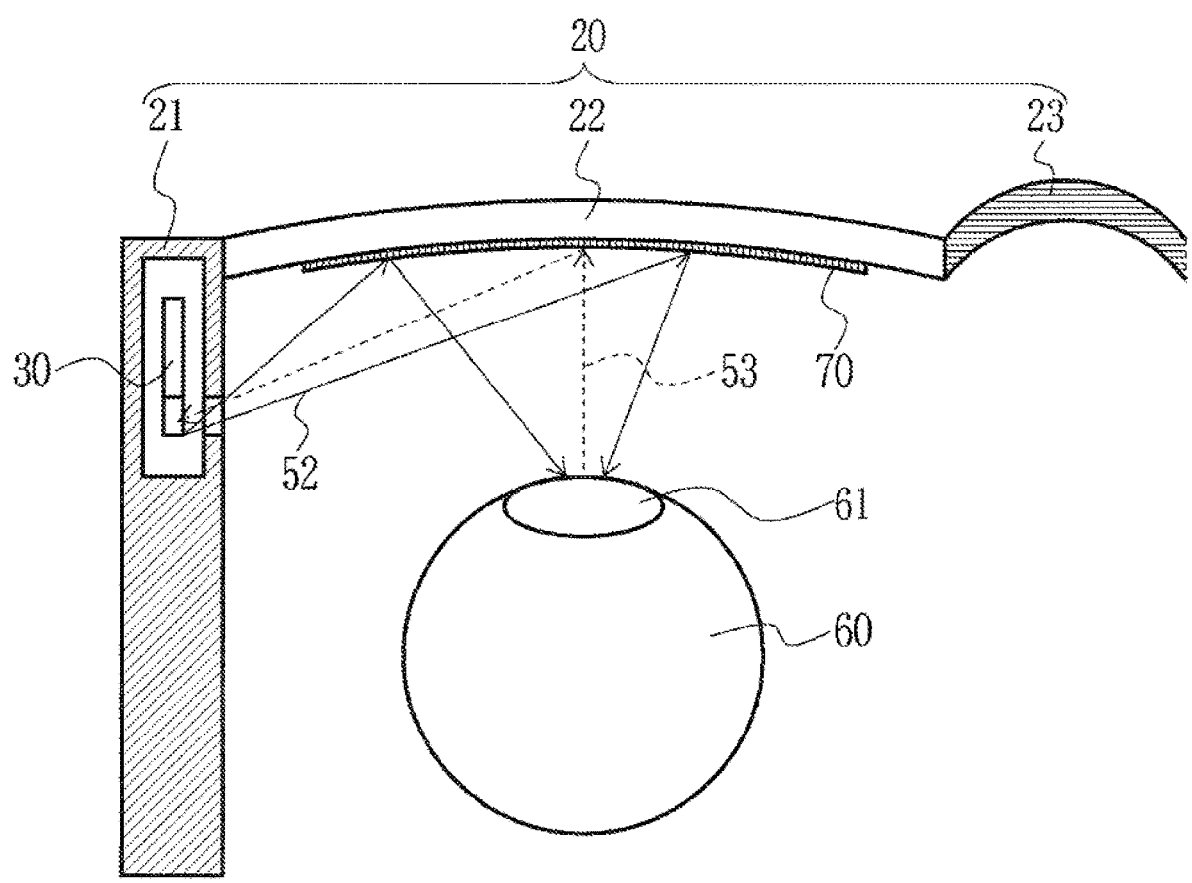
FIG. 11 is a diagram illustrating the configuration of the main portion of the image generating device according to Example 4 of the present invention.

Next, the image generating device according to Example 4 of the present invention is described in reference to FIG. 11. FIG. 11 is a diagram showing the configuration of the main portion of the image generating device according to Example 4 of the present invention. The eyeglasses 20 are formed of a temple 21, an eyeglasses lens 22 and a bridge 23 where in some cases the outer periphery portion of the eyeglasses lens 22 is supported by a rim (not shown). An optical engine 30 made of a light source and a light scanning mirror is housed inside the end portion of the temple 21 of the eyeglasses 20. In addition, a holographic reflection plate 70 is pasted to a portion of the eyeglasses lens 22.

The scanning light beam 52 emitted from the optical engine 30 scans the surface of the eyeball 60 that includes a pupil 61. The reflected light therefrom is reflected from the holographic reflection plate 70 or the like so as to enter into the optical engine 30. At this time, the current/voltage characteristics of each semiconductor laser that forms the light source in the optical engine 30 change, and therefore, this change is detected by the current/voltage fluctuation detection circuit that is provided in the driver circuit of the optical engine 30. Here, in the image generating method, the position of the beam spot that is irradiated with the light beam for generating an image is controlled not by the change in the intensity of the reflected light but by the change in the current/voltage.

Example 5

Figure 12:
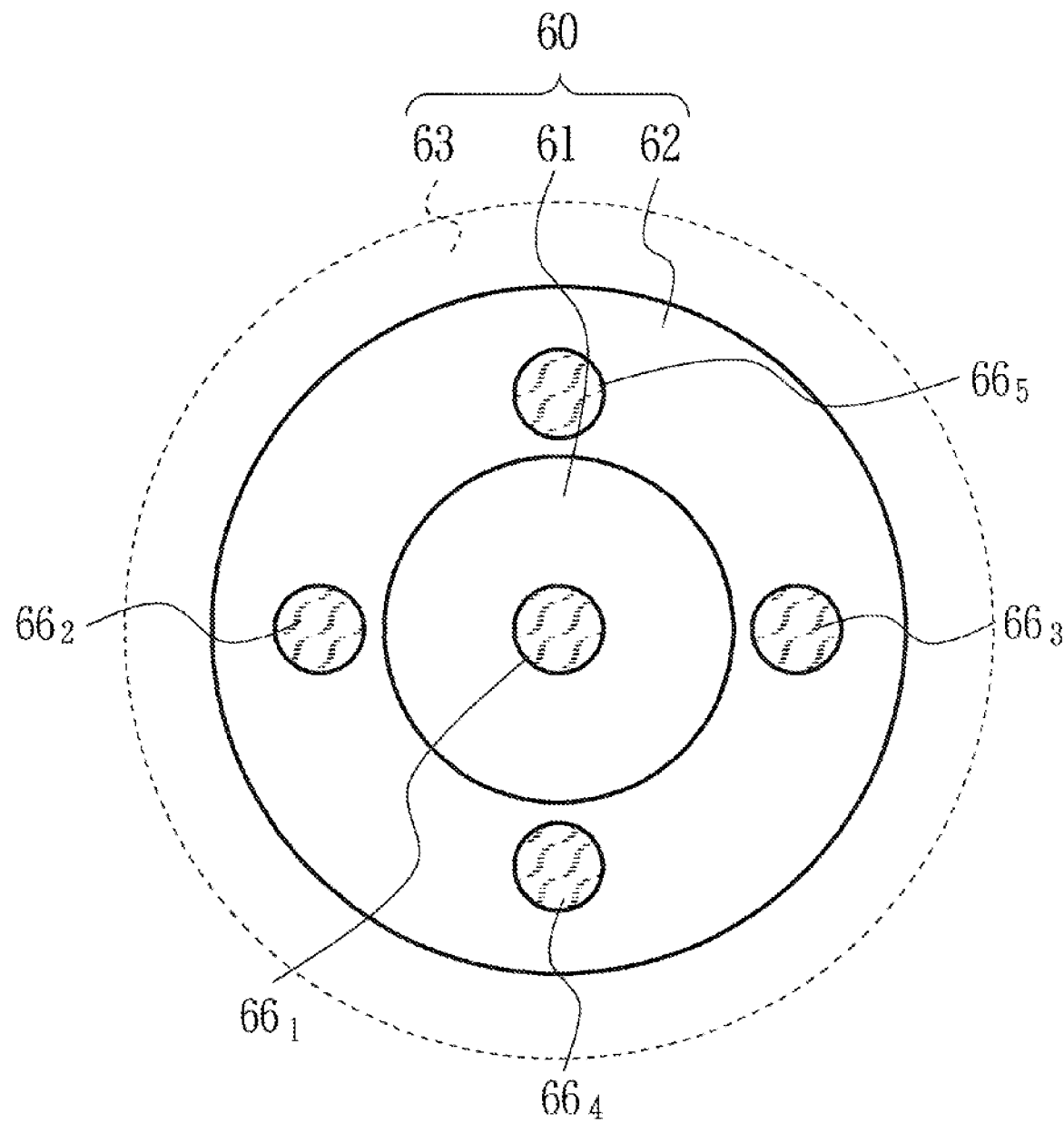
FIG. 12 is a diagram illustrating the image generating method in a system of a plurality of beam spots according to Example 5 of the present invention.

Next, the image generating method by means of a system with a plurality of beam spots according to Example 5 of the present invention is described in reference to FIG. 12. FIG. 12 is a diagram illustrating the image generating method by means of a system with a plurality of beam spots according to Example 5 of the present invention. The diagram illustrates the size and the position of the spot of the beam for generating an image on the pupil that are required to project a normal image onto the retina without the image being partially missed in the case where the position of the pupil 61 changes (in the case where the pupil is moved). A method for preparing a plurality of spots of beams for generating an image is disclosed as a method for coping with the case where the position of the pupil 61 has been changed (see Non-Patent Literature 1).

As illustrated in FIG. 12, the spot of a beam for generating an image $66_1$ is set at the center of the pupil 61 in the case where the pupil is directed straight forward, and spots of beams for generating an image $66_2$ through $66_5$ are set in order to cope with the case where the pupil moves to the left, right, upward and downward from the straight forward position. In the figure, only one spot is set to the left, the right, upward and downward respectively; however, a plurality of spots may be set to the left, the right, upward and downward respectively so that a wider range can be covered.

The following two methods are possible as the image generating method at this time. According to the first method, one spot of a beam for generating an image that is almost contained within the pupil is selected, and a three primary color light beam having the same position and size of the spot of the beam for generating an image is actually scanned to generate an image on the retina. Only one position from among these set spots of beams for generating an image $66_1$ through $66_5$ is irradiated with the actual three primary color light beam. Which position of the spot of a beam for generating an image that is to be irradiated with an actual beam while scanning is determined by detecting the position of the pupil 61.

According to the second method, a three primary color light beam having the position and the size of every set spot of a beam for generating an image $66_1$ through $66_5$ is actually scanned to generate an image on the retina. Here, signals of the three primary color light beam for generating the respective spots of the beam for generating an image are modified relative to each other so that the image does not blur on the retina. Here, the size of the pupil is approximately 2.5 mm to 4 mm in the diameter, the amount of change in the position of the pupil is approximately +/−10 mm in the left to right direction, and approximately +/−5 mm in the upward and downward direction, and the size of the spot of the beam for generating an image is smaller than approximately 4 mm in the diameter. The intervals of the positions of the spots of beams for generating an image are approximately 2.5 mm to 4 mm in both the left to right and upward and downward directions. The figure illustrates one spot to the left, the right, upward and downward respectively; however, approximately six spots may be provided in the left and right direction, and approximately three spots may be provided in the upward and downward direction.

Example 6

Figure 13:
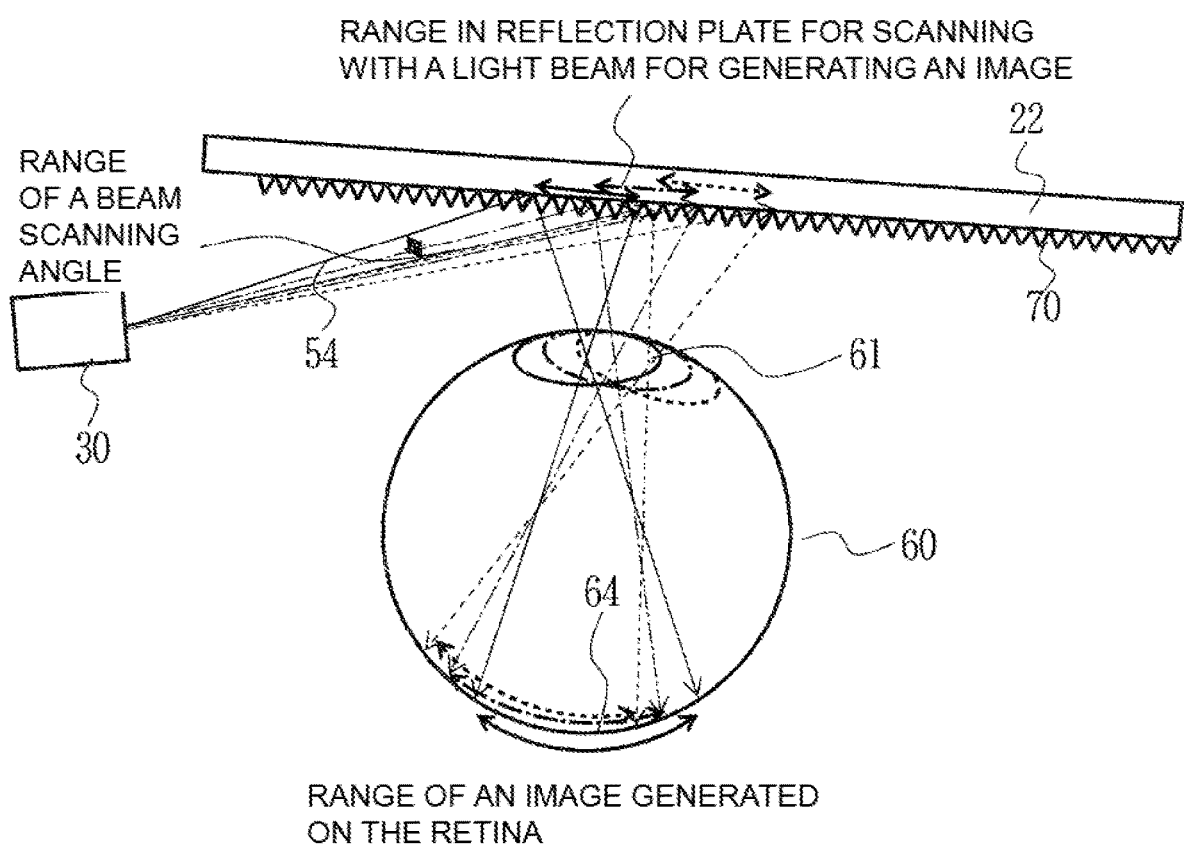
FIG. 13 is a diagram illustrating the image generating method in a system of a plurality of beam spots according to Example 6 of the present invention.

Next, the image generating method by means of a system with a plurality of beam spots according to Example 6 of the present invention is described in reference to FIG. 13. FIG. 13 is a diagram illustrating the image generating method by means of a system with a plurality of beam spots according to Example 6 of the present invention. The diagram illustrates the size and the position of the spot of the beam for generating an image on the pupil that are required to project a normal image onto the retina without the image being partially missed in the case where the position of the pupil 61 changes (in the case where the pupil is moved).

The three primary color light beam 54 emitted from the optical engine 30 is scanned in the set range of an angle at which the beam is scanned so as to be converged in a spot on the pupil 61 by the holographic reflection plate 70, and thus, an image is generated on the retina 64. In the case where the position of the pupil 61 has moved (the pupil position changes as illustrated with a solid line, a broken line and a single-dotted chain line), the three primary color light beams 54 emitted from the optical engine 30 (denoted by the types of lines that correspond to the types of lines of the pupil that has moved) are reflected from different regions of the holographic reflection plate 70 so that the three primary color light beams 54 are respectively guided to the positions of the spot that can be contained within the pupil 61 that has moved, and thus, an image is generated in a range of the generated image on the retina 64 that is denoted by the types of lines that correspond to the types of lines of the moved pupil 61.

Here, the scanning is carried out with the three primary color light beam 54 emitted from the optical engine 30 as follows.

(1) The scanning is carried out only in each of the ranges of an angle for the scanning with the beam that are respectively denoted by a solid line, a single-dotted chain line and a broken line in the figure.

(2) The scanning may be carried out in a wide range of an angle at which the beam is scanned that includes all the ranges of an angle at which the beam is scanned that are respectively denoted by a solid line, a single-dotted chain line and a broken line in the figure, and a signal for an image is emitted only from the scanning within each range of an angle at which the beam is scanned that is denoted by a solid line, a single-dotted chain line or a broken line.

(3) The scanning may be carried out in a wide range of an angle for the scanning with the beam that includes all the ranges of an angle for the scanning with the beam that are respectively denoted by a solid line, a single-dotted chain line and a broken line in the figure, and a signal for an image is emitted for the entirety of the wide range of an angle for the scanning with the beam. Here, signals that are emitted from the scanning within the respective ranges of an angle for the scanning with the beam that are denoted by a solid line, a single-dotted chain line and a broken line are modified so that the image does not blur on the retina. From among these, the methods (1) and (2) have advantageous points where the time during which an image signal is emitted is short and the power consumption for generating an image is low. Here, the region on the holographic reflection plate other than the range of the reflection plate for scanning the beam for generating an image is used as the range of the reflection plate for the scanning with the beam for detecting the pupil position in the same manner as in FIG. 6, and thus, the scanning is carried out with the scanning light beam for detecting the pupil position in order to detect the position and the size of the pupil 61 in advance.

Example 7

Figure 14:
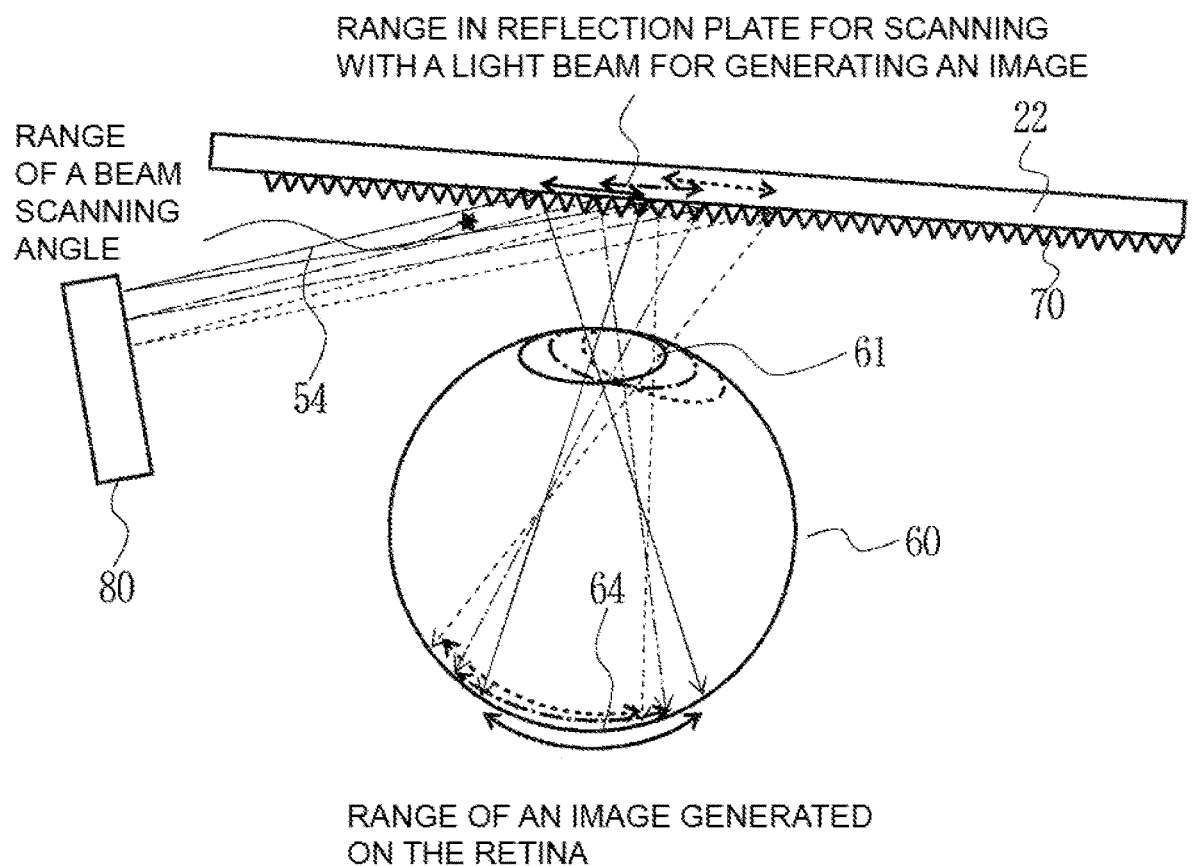
FIG. 14 is a diagram illustrating the image generating method in a system of a plurality of beam spots according to Example 7 of the present invention.
Figure 15:
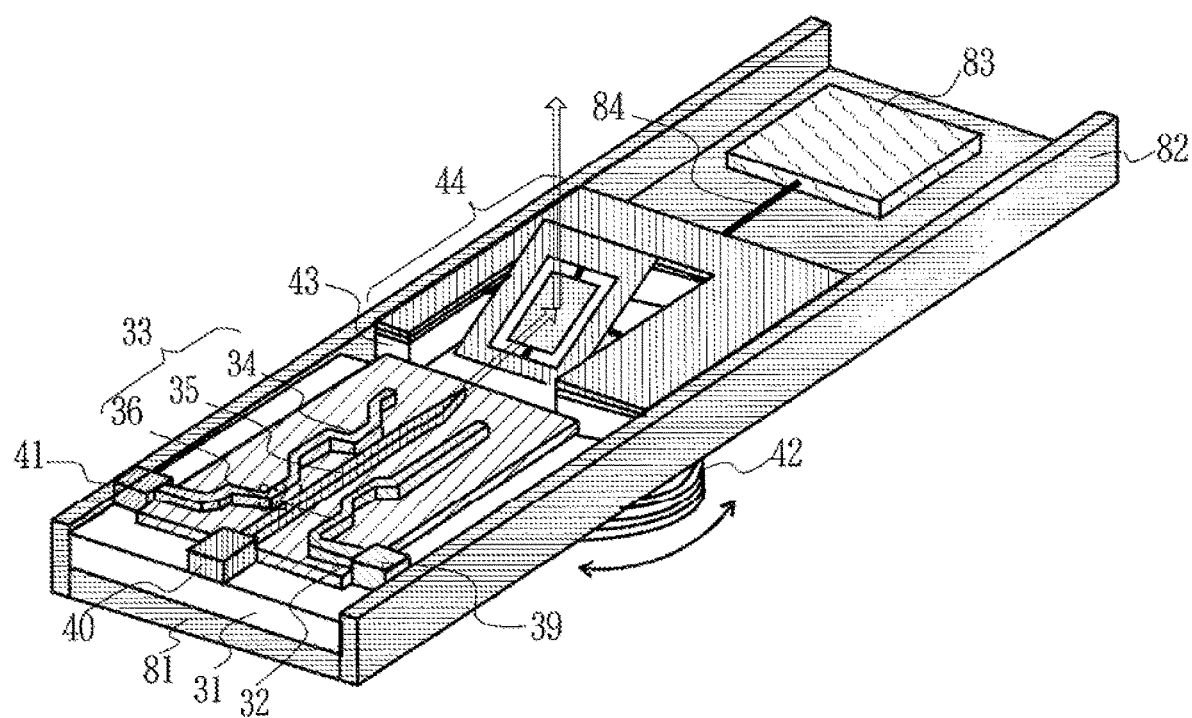
FIG. 15 is a schematic perspective diagram illustrating an optical engine that is used in the image generating method in a system of a plurality of beam spots according to Example 7 of the present invention.

Next, the image generating method by means of a system with a plurality of beam spots according to Example 7 of the present invention is described in reference to FIGS. 14 and 15. FIG. 14 is a diagram illustrating the image generating method by means of a system with a plurality of beam spots according to Example 7 of the present invention. The diagram illustrates the size and the position of the spot of the beam for generating an image on the pupil that are required to project a normal image onto the retina without the image being partially missed in the case where the position of the pupil 61 is changed (in the case where the pupil is moved).

The three primary color light beams 54 are emitted from different beam emitting positions that have been set on the optical engine 80 and scanned within the set range of an angle for the scanning with the beam. Next, the beams are converged onto a spot on the pupil 61 by means of a holographic reflection plate 70 so that an image is generated on the retina 64. In the case where the position of the pupil 61 has moved (change in the pupil position first denoted by a solid line, then a broken line, and finally a single-dotted chain line), the three primary color light beams emitted from the optical engine 80 (denoted by the types of lines that correspond to the types of lines of the moved pupil) are reflected from different regions on the holographic reflection plate 70 in such a manner that three primary color light beams 54 are guided to the spot that is contained within the pupil 61 that has moved to the respective positions, and thus, an image is generated within the ranges of the generated image on the retina 64 that are respectively denoted by the types of lines corresponding to the types of lines of the moved pupil 61. Here, the scanning is carried out with the three primary color light beams 54 emitted from the optical engine 80 as follows.

(1) The scanning is carried out only within the ranges of an angle for the scanning with the beam for the beams that have been emitted from the respective beam emitting positions denoted by a solid line, a single-dotted chain line and a broken line in the figure.

(2) The scanning may be carried out within a wide range of an angle for the scanning with the beam that covers all the ranges of an angle for the scanning with the beam where the beams have been emitted from the respective beam emitting positions denoted by a solid line, a single-dotted chain line and a broken line in the figure, and a signal for an image is emitted on the basis of only the scanning within the range of an angle for the scanning with the beam where the beams are emitted from the respective beam emitting positions that are denoted by a solid line, a single-dotted chain line and a broken line.

(3) The scanning may be carried out within a wide range of an angle for the scanning with the beam that covers all the ranges of an angle for the scanning with the beam where the beams have been emitted from the respective beam emitting positions denoted by a solid line, a single-dotted chain line and a broken line in the figure, and a signal for an image is emitted on the basis of the scanning for the entirety of the wide range. Here, signals of the beams that are emitted from the respective beam emitting positions that are denoted by a solid line, a single-dotted chain line and a broken line are modified so that the image does not blur on the retina. From among these, the methods (1) and (2) have advantageous points where the time during which an image signal is emitted is short and the power consumption for generating an image is low. Here, the region on the holographic reflection plate other than the range of the reflection plate for scanning the beam for generating an image is used as the range of the reflection plate for scanning the beam for detecting the pupil position in the same manner as in FIG. 6, and thus, the scanning is carried out with the scanning light beam for detecting the pupil position in order to detect the position and the size of the pupil 61 in advance.

FIG. 15 is a schematic perspective diagram illustrating the optical engine that is used in the image generating method by means of a system with a plurality of beam spots according to Example 7 of the present invention. In the same manner as in FIG. 4, an $SiO_2$ film 32 is formed on an Si substrate 31 in a light source unit. Next, a film of $SiO_2$—$GeO_2$ layers is formed on the $SiO_2$ film 32, and then, light waveguides 34 through 36 with a certain waveguide width are patterned in accordance with a light exposure method using a contact mask so as to provide an optical multiplexer 33. Next, an $SiO_2$ film (not shown) having a thickness of 20 μm is formed as an upper clad layer so as to provide a cover layer that covers the entirety of the patterned light waveguides 34 through 36.

Meanwhile, in the same manner as in the case in FIG. 4, a two-dimensional light scanning mirror unit 44 having a double-frame structure with a rotatable outer frame and a non-rotatable outer frame that are respectively supported by a pair of hinges is formed on an Si substrate 43 that is different from the Si substrate 31.

The Si substrate 31 on which this light source unit has been formed and the Si substrate 41 on which the two-dimensional light scanning mirror unit 44 has been formed are mounted on a common substrate 81 on which a movement guide 82 has been provided, and a solenoid coil 42 is arranged beneath the two-dimensional light scanning mirror unit 44. At this time, a module 83 for a moving mechanism is connected to the Si substrate 41 on which the two-dimensional light scanning mirror unit 44 has been formed with a movement bar 84 in between so that the Si substrate 41 can slide along the movement guide 82 on the common substrate 81. The module 83 for a moving mechanism extends and draws in the movement bar 84 to the front and to the rear so that the two-dimensional light scanning mirror unit 44 can be moved. As a result, the position of the three primary color light beam that is emitted from the optical engine can be moved.

A non-magnetic metal such as Al or Cu is used for the common substrate 81 and the movement guide 82 so that the operation of the two-dimensional light scanning mirror unit 44 where a magnetic thin film is provided is not affected, and Al is used here. An electromagnetic drive type actuator with a cylindrical micro-coil is used as the module 83 for a moving mechanism.

Example 8

Figure 16:
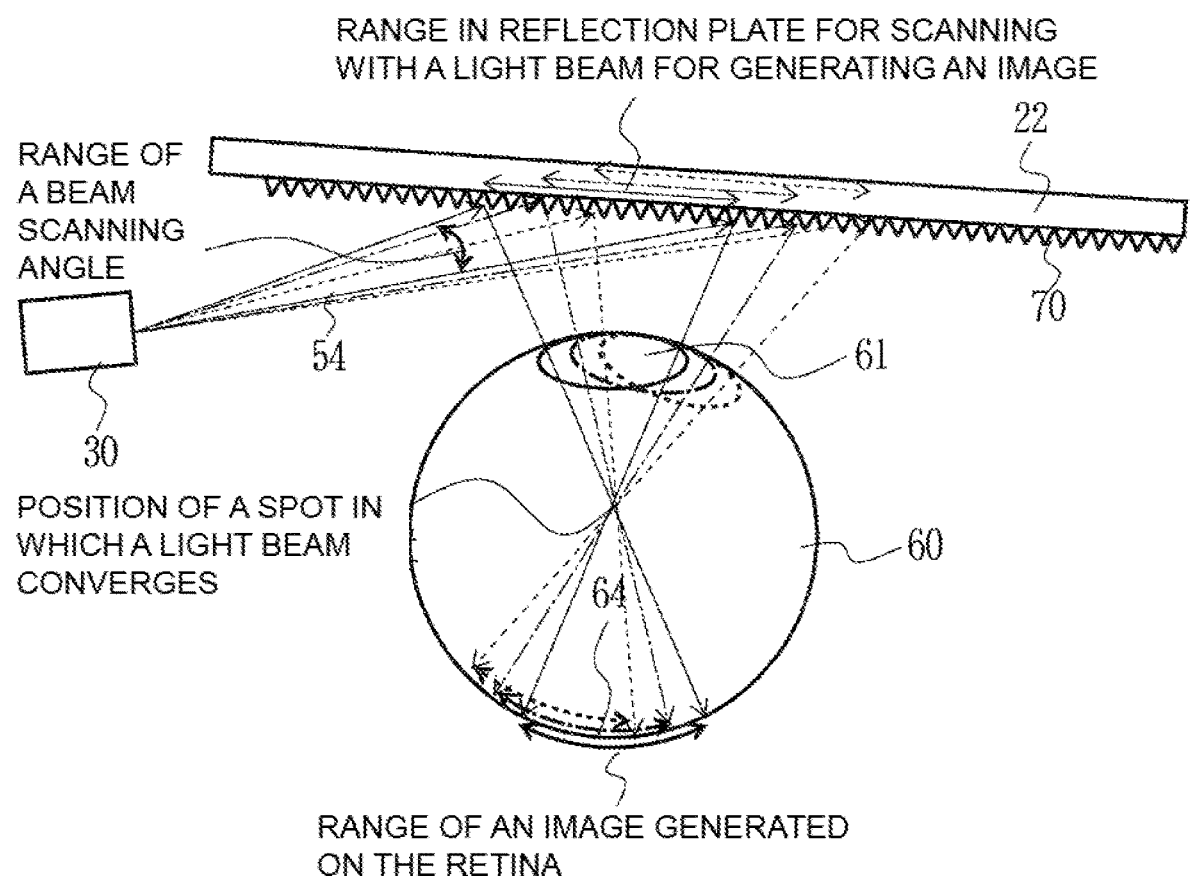
FIG. 16 is a diagram illustrating the image generating method in a system where a beam spot continuously moves according to Example 8 of the present invention.

Next, the image generating method by means of a system where the beam spot continuously moves according to Example 8 of the present invention is described in reference to FIG. 16. FIG. 16 is a diagram illustrating the image generating method by means of a system where the beam spot continuously moves according to Example 8 of the present invention. The diagram illustrates the size and the position of the spot of the beam for generating an image on the pupil that are required to project a normal image onto the retina without the image being partially missed in the case where the position of the pupil 61 is changed (in the case where the pupil is moved).

Scanning within the set range of an angle for the scanning with the beam is carried out with the three primary color light beam 54 that has been emitted from the optical engine 30, and then, the three primary color light beam 54 is guided by the holographic reflection plate 70 into the pupil 61 so that an image is generated on the retina 64. In the case where the position of the pupil 61 has moved (change in the pupil position as first denoted by a solid line, then by a broken find, and finally a single-dotted chain line), the three primary color light beam 54 emitted from the optical engine 30 (denoted by the type of line that corresponds to the type of line of the moved pupil) is reflected from a different region on the holographic reflection plate 70 so as to guide the three primary color light beam into the pupil that has moved to each position, and thus, an image is generated within the range of the generated image on the retina 61 that is denoted by the type of line that corresponds to the type of line of the moved pupil 61.

At this time, the spots onto which the scanned three primary color light beams 54 converge are not set on the pupil 61 but inside the eyeball 60 as illustrated in the figure. In addition, this position is set so that almost all of the three primary color light beams 54 emitted from the optical engine 30 can converge on this spot. By doing this, a correct image can be generated on the retina 64 even in the case where the ranges of the scanning of the respective three primary color light beams 54 that are denoted by the types of lines that correspond to the types of lines of the moved pupil 61 overlap.

Here, the scanning is carried out with the three primary color light beam 54 emitted from the optical engine 30 as follows.

(1) The scanning is carried out only in each of the ranges of an angle for the scanning with the beam where the beams are respectively denoted by a solid line, a single-dotted chain line and a broken line in the figure.

(2) The scanning may be carried out in a wide range of an angle for the scanning with the beam that includes all the ranges of an angle for the scanning with the beam where the beams are respectively denoted by a solid line, a single-dotted chain line and a broken line in the figure, and a signal for an image is emitted only from the scanning within each range of an angle for the scanning with the beam that is denoted by a solid line, a single-dotted chain line or a broken line.

(3) The scanning may be carried out in a wide range of an angle for the scanning with the beam that includes all the ranges of an angle for the scanning with the beam where the beams are respectively denoted by a solid line, a single-dotted chain line and a broken line in the figure, and a signal for an image is emitted for the entirety of the wide range of an angle for the scanning with the beam. Here, signals that are emitted from the scanning within the respective ranges of an angle for the scanning with the beam where the beams are denoted by a solid line, a single-dotted chain line and a broken line are modified so that the image does not blur on the retina. From among these, the methods (1) and (2) have advantageous points where the time during which an image signal is emitted is short and the power consumption for generating an image is low. Here, the region on the holographic reflection plate other than the range of the reflection plate for scanning the beam for generating an image is used as the range of the reflection plate for scanning the beam for detecting the pupil position in the same manner as in FIG. 6, and thus, the scanning is carried out with the scanning light beam for detecting the pupil position in order to detect the position and the size of the pupil 61 in advance.

Example 9

Figure 17:
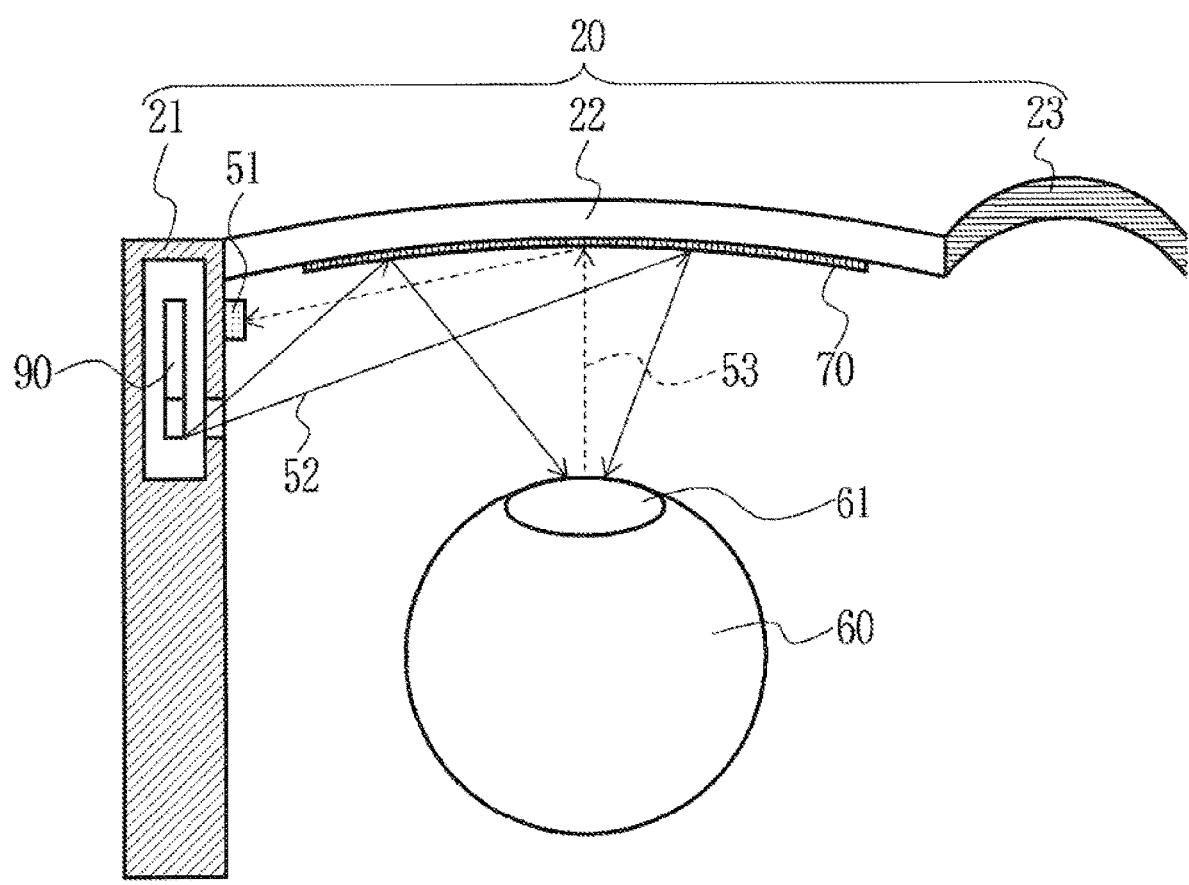
FIG. 17 is a diagram illustrating the configuration of the main portion of the pupil position detection device according to Example 9 of the present invention.

Next, the pupil position detection device according to Example 9 of the present invention is described in reference to FIGS. 17 through 19B. FIG. 17 is a diagram illustrating the configuration of the main portion of the pupil position detection device according to Example 9 of the present invention. Eyeglasses 20 are a temple 21, an eyeglasses lens 22 and a bridge 23, where in some cases, the outer periphery portion of the eyeglasses lens 22 is supported by a rim (not shown). An optical engine 90 made of a light source and a light scanning mirror is housed inside the temple 21 of the eyeglasses 20, and at the same time, a photodetector 51 is attached in the vicinity thereof. A holographic reflection plate 70 is pasted to a portion of the eyeglasses lens 22.

The scanning light beam 52 emitted from the optical engine 90 is reflected from the holographic reflection plate 70 for the scanning of the surface of the eyeball 60 that contains a pupil 61. The reflected light is again reflected from the holographic reflection plate 70 so as to be detected by the photodetector 51. Here, it is desirable for an optical filter that allows light with a wavelength that is used for the scanning light beam 52 to pass through to be provided in front of the photodetector 51 so that stray light from the outside can be shut out.

The basic structure of the optical engine 90 is basically the same as that of the optical engine 30 illustrated in FIG. 4; however, the light source may be only a light source for tracking a pupil, and therefore, a single semiconductor laser or a collimated LED, and for example, an infrared ray semiconductor laser is used. The light waveguide may be patterned only as a single linear form; however, the patterned light waveguide is not essential, and for example, the two-dimensional light scanning mirror may be directly irradiated with the scanning light beam from the semiconductor laser.

Figure 18:
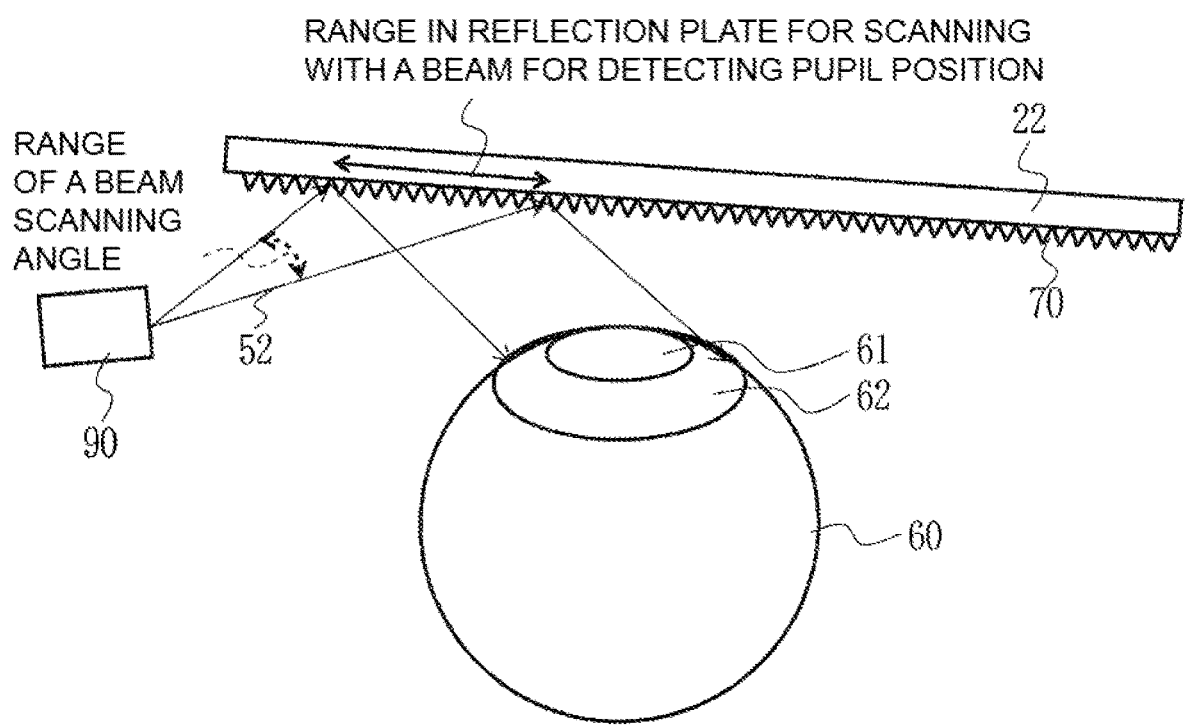
FIG. 18 is a diagram illustrating the state of irradiation with a scanning light beam according to Example 9 of the present invention.

Here, FIG. 18 is a diagram illustrating the state of irradiation with the scanning light beam in Example 9 of the present invention, where the scanning is carried out two-dimensionally, and this drawing is provided on a plane for the purpose of simplicity. The scanning light beam 52 emitted from the optical engine 90 is reflected from the holographic reflection plate 70 for the scanning of the surface of the eyeball 60 that includes the pupil 61. The reflected light is again reflected from the holographic reflection plate 70 so as to be detected by the photodetector (51) that is attached to the temple of the eyeglasses, and thus, the position of the pupil 61 is detected.

Figure 19A:
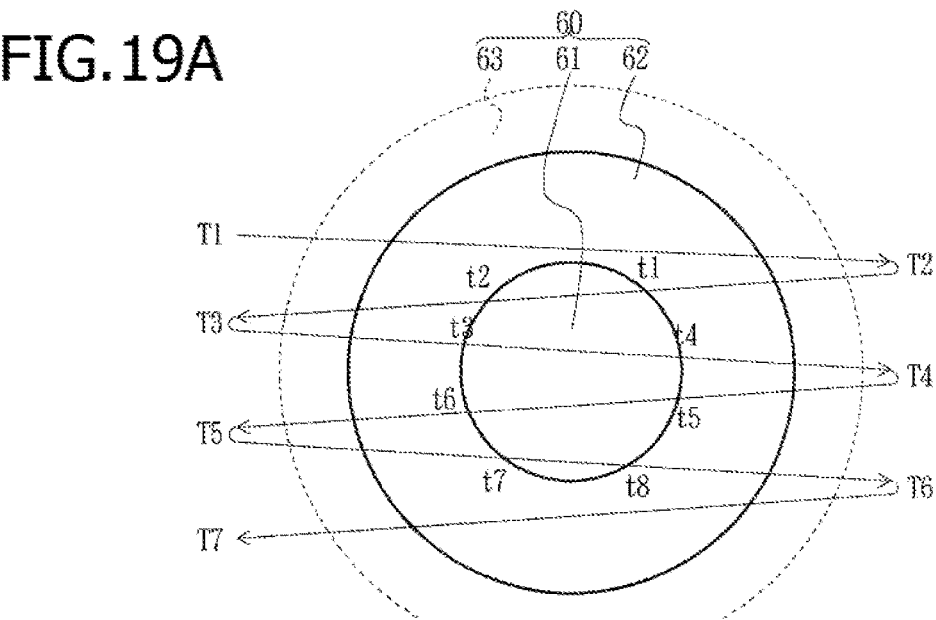
FIGS. 19A and 19B are diagrams illustrating the pupil position detection method where the pupil position detection device according to Example 9 of the present invention is used.
Figure 19B:
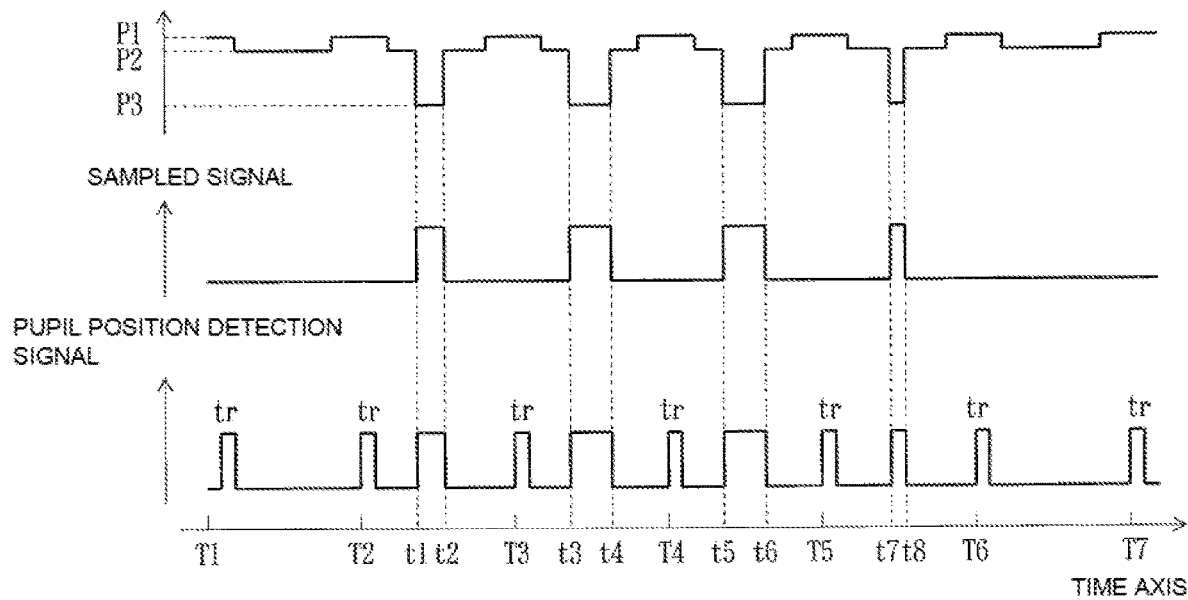

FIGS. 19A and 19B are a diagram and a graph illustrating the pupil position detection method where the pupil position detection device according to Example 9 of the present invention is used. FIG. 19A is a diagram illustrating the state of scanning with the light beam, and FIG. 19B is a graph illustrating the intensity of the reflected light and a sampled signal. As illustrated in FIG. 19A, the pupil 61, the iris 62 and the white of the eye 63 around these are irradiated with the light beam 53 while scanning the area that includes these. Here, the size of the pupil is approximately 2.5 mm to 4 mm in diameter, the width of the scanning with the scanning light beam is approximately +/−20 mm in the left to right direction and approximately +/−12 mm in the upward and downward direction. This setting of the scanning width makes it possible to detect the precise position of the pupil 61 when the position of the pupil 61 is changed by approximately +/−10 mm in the left to right direction and by approximately +/−5 mm in the upward and downward direction.

As illustrated in the upper part of FIG. 19B, as for the intensity of the reflected light detected by the photodetector 51, the reflected light P1 from the white of the eye 63 is the most intense, the reflected light P2 from the iris 62 is the second most intense, and the reflected light P3 from the pupil 61 is the least intense. The lower part of FIG. 19B illustrates a signal that covers time zones where the signal P3 sampled by using a signal level selector circuit can be gained. The time zones where the signal P3 can be gained are between t1 and t2, between t3 and t4, between t5 and t6, and between t7 and t8. The pupil 61 is irradiated with the scanning light beam 52 only during these time intervals.

In order to detect the position of the pupil 61 from these signals, like tr illustrated in the lower part of FIG. 19B, a short signal is generated as a trigger in the respective time slots that correspond to the respective points at which the scanning returns, and the time difference vis-à-vis the trigger is measured so that the position of the pupil 61 is determined by backwardly calculating from the time difference. For example, in the beam scanning between T2 and T3, the pupil 61 starts from the amount of change in the position that corresponds to the time between T2 and t1, and the amount of change in the position that corresponds to the time between t1 and t2 corresponds to the width of the pupil 61. In addition, the interval between t1 and t2, the interval between t3 and t4, the interval between t5 and t6, and the interval between t7 and t8 are compared so that the position of the pupil 8 in the upward and downward direction in the figure can be detected.

Accordingly, the detection of the eyeline for the application to a handicapped person's aid system or the detection of the eyeline at the time of the monitoring of the awareness and the attention of a person who is driving can be made easy without the use of an imaging device or the like. Here, in this case in Example 4 as well, the scanning light beam may propagate through the eyeglasses lens like in the above-described case in Example 2.

Example 10

Figure 20:
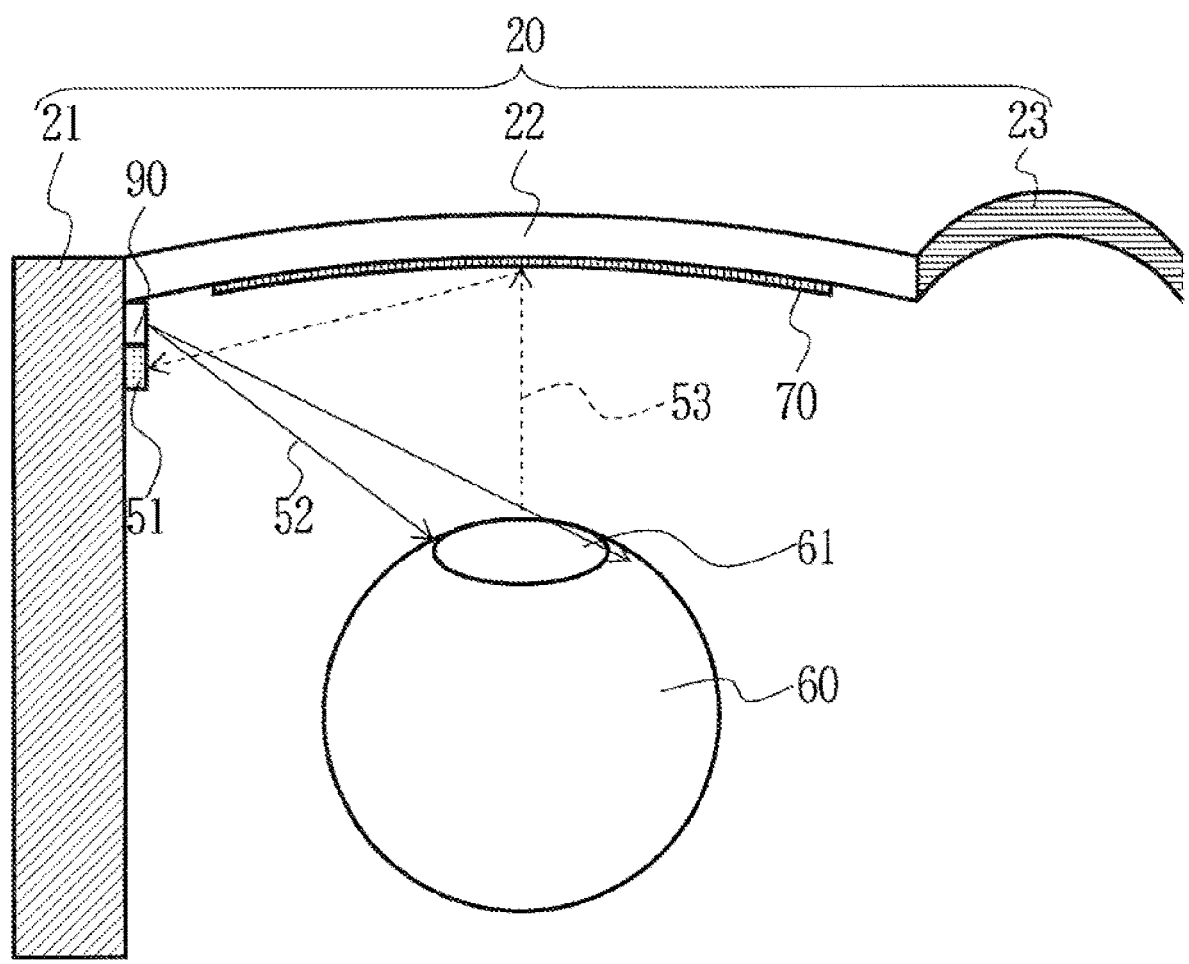
FIG. 20 is a diagram illustrating the configuration of the main portion of the pupil position detection device according to Example 10 of the present invention.

Next, the pupil position detection device according to Example 10 of the present invention is described in reference to FIG. 20. FIG. 20 is a diagram illustrating the configuration of the main portion of the pupil position detection device according to Example 10 of the present invention. Eyeglasses 20 are a temple 21, an eyeglasses lens 22 and a bridge 23, where in some cases, the outer periphery portion of the eyeglasses lens 22 is supported by a rim (not shown). An optical engine 90 and a photodetector 51 are attached to the end portion of the temple 21 of the eyeglasses. In addition, a holographic reflection plate 70 is pasted to a portion of the eyeglasses lens 22. Here, the optical engine 90 merely detects the position of the pupil 61, and therefore, the optical engine 90 may have a single light source, and for example, an infrared ray semiconductor laser may be used as the light source.

In Example 10, the surface of the eyeball 60 that contains a pupil 61 is scanned with the scanning light beam 52 that is emitted from the optical engine 90. The reflected light 53 therefrom is reflected from the holographic reflection plate 70 so as to be detected by the photodetector 51. In this case as well, it is desirable for an optical filter that allows light with a wavelength that is used for the scanning light beam 52 to pass through to be provided in front of the photodetector 51 so that stray light from the outside can be shut out.

Example 11

Figure 21:
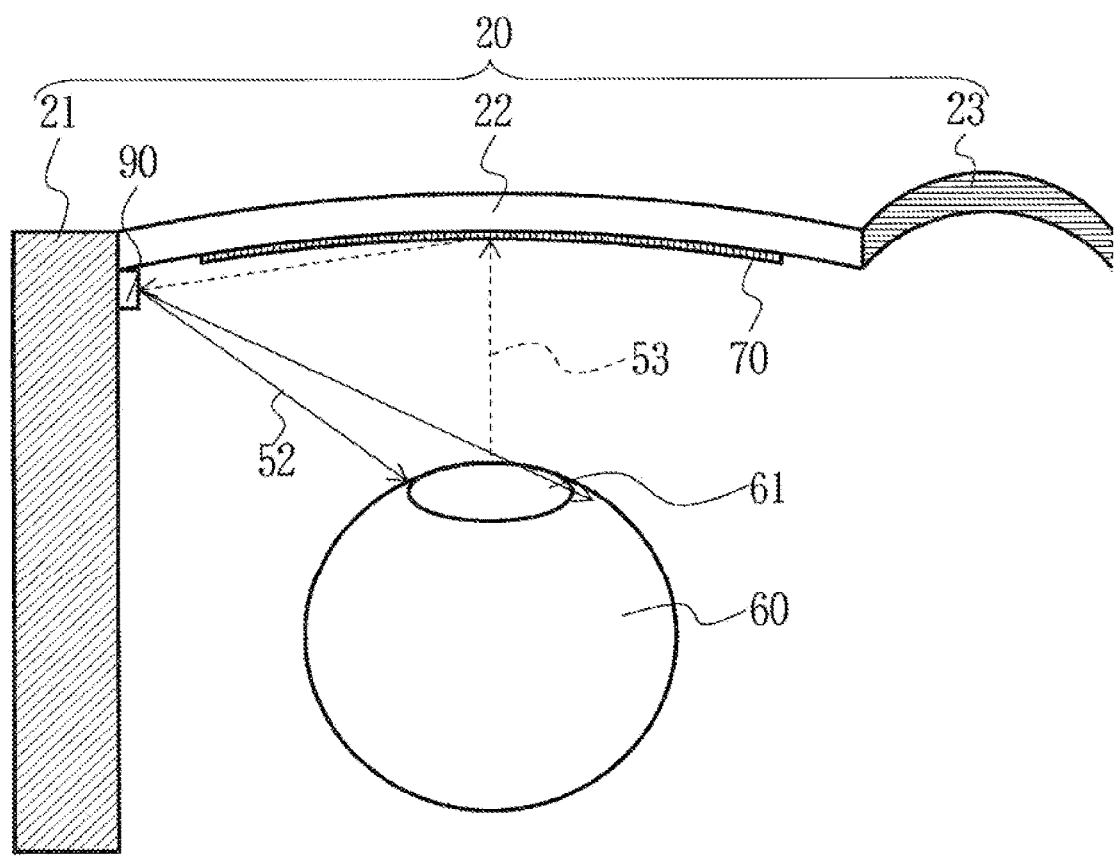
FIG. 21 is a diagram illustrating the configuration of the main portion of the pupil position detection device according to Example 11 of the present invention.

Next, the pupil position detection device according to Example 11 of the present invention is described in reference to FIG. 21. FIG. 21 is a diagram showing the configuration of the main portion of the pupil position detection device according to Example 11 of the present invention. The eyeglasses 20 are formed of a temple 21, an eyeglasses lens 22 and a bridge 23 where in some cases the outer periphery portion of the eyeglasses lens 22 is supported by a rim (not shown). An optical engine 90 is attached to the end portion of the temple 21 of the eyeglasses. In addition, a holographic reflection plate 70 is pasted to a portion of the eyeglasses lens 22. Here, the optical engine 90 merely detects the position of the pupil 61, and therefore, the optical engine 90 may have a single light source, and for example, an infrared ray semiconductor laser may be used as the light source.

In Example 11, the surface of the eyeball 60 that includes a pupil 61 is scanned with the scanning light beam 52 that is emitted from the optical engine 30. The reflected light 53 therefrom is reflected from the holographic reflection plate 70 or the like so as to enter into the optical engine 90. At this time, the current/voltage characteristics of each semiconductor laser that forms the light source in the optical engine 30 change, and therefore, this change is detected by the current/voltage fluctuation detection circuit that is provided in the driver circuit of the optical engine 30. In this case as well, the optical engine 90 may be housed inside the temple 21 of the eyeglasses as in Example 4.

Example 12

Figure 22:
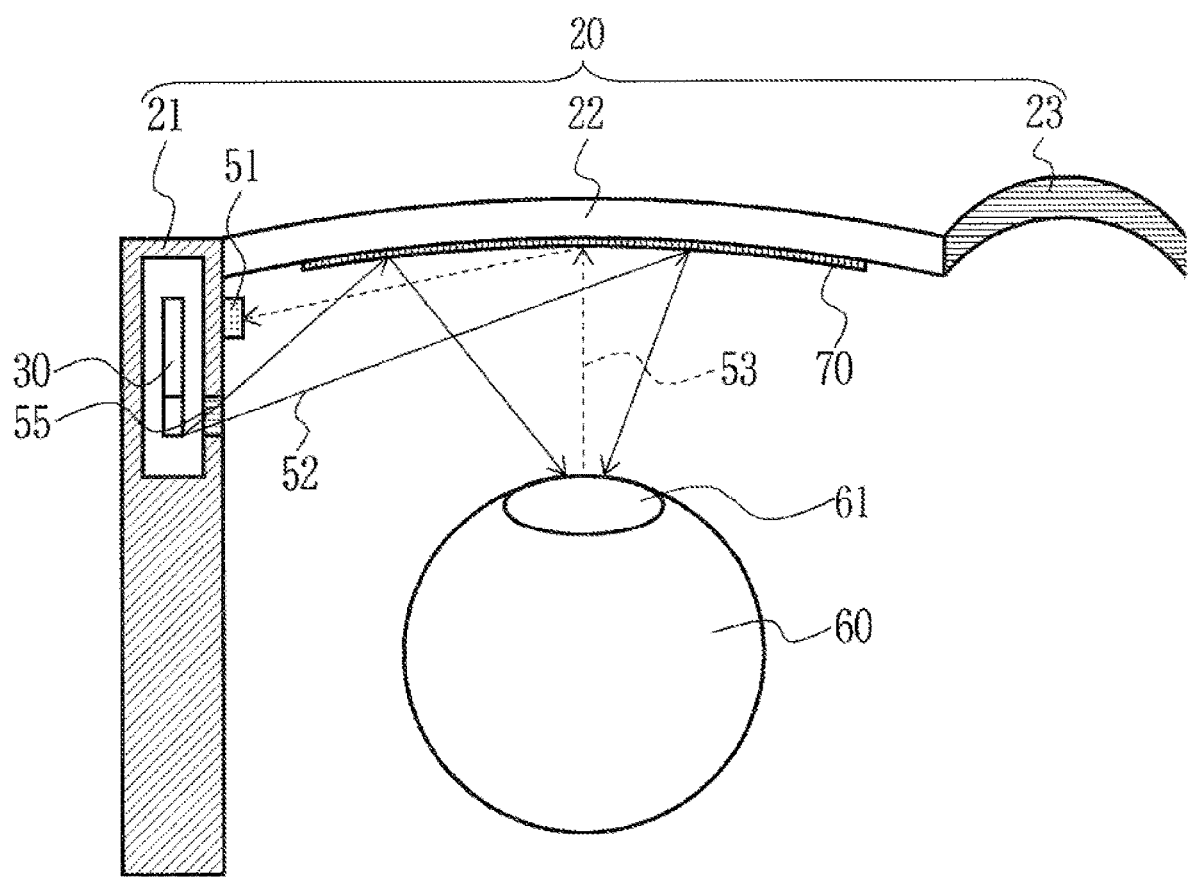
FIG. 22 is a diagram illustrating the configuration of the main portion of the pupil position detection device according to Example 12 of the present invention.

Next, the image generating device according to Example 12 of the present invention is described in reference to FIG. 22. In Example 12 of the present invention, the scanning for detecting the pupil position and the scanning for generating an image are separately carried out timewise like in the above-described case in Example 1. FIG. 22 is a diagram illustrating the configuration of the main portion of the image generating device according to Example 12 of the present invention. Eyeglasses 20 are formed of a temple 21, an eyeglasses lens 22 and a bridge 23 where in some cases the outer peripheral portion of the eyeglasses lens 22 is supported by a rim (not shown). An optical engine 30 made of a light source and a light scanning mirror is housed inside the temple 21 of the eyeglasses 20, and at the same time, a photodetector 51 is attached in the vicinity thereof. A holographic reflection plate 70 is pasted to a portion of the eyeglasses lens 22. Example 12 is the same as Example 1, except the point where a light path switching element 55 is provided in the unit for outputting the scanning light beam 52 from the optical engine 30 in the temple 21. Here, a prism mirror is used as the light path switching element 55; however, a total reflection/transmission element or an electrooptical element may be used instead of the prism mirror.

In this case, the light path of the scanning light beam 52 emitted from the optical engine 30 is switched between the scanning for detecting the pupil position and the scanning for generating an image. That is to say, the scanning for detecting the pupil position is carried out when the light path switching element 55 is in the "off" state, and the light path switching element 55 is turned on to switch the light path for the scanning for generating an image after the pupil position has been detected. In Example 12 of the present invention, the light path switching element 55 is provided so that the range of the angle for scanning can be effectively used without the necessity for using a light scanning mirror having a wide angle for scanning in the optical engine 30.

Example 13

Figure 23:
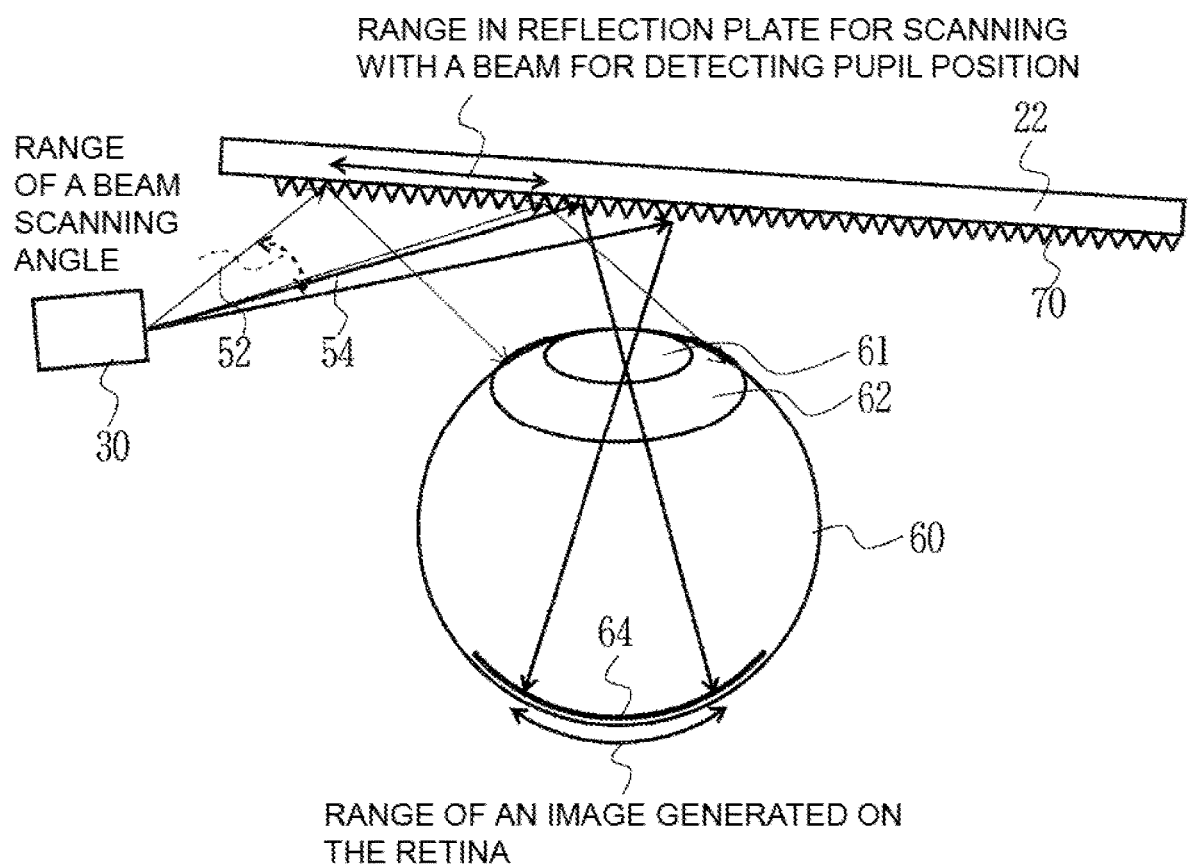
FIG. 23 is a diagram illustrating the state of irradiation with a scanning light beam according to Example 13 of the present invention.
Figure 24A:
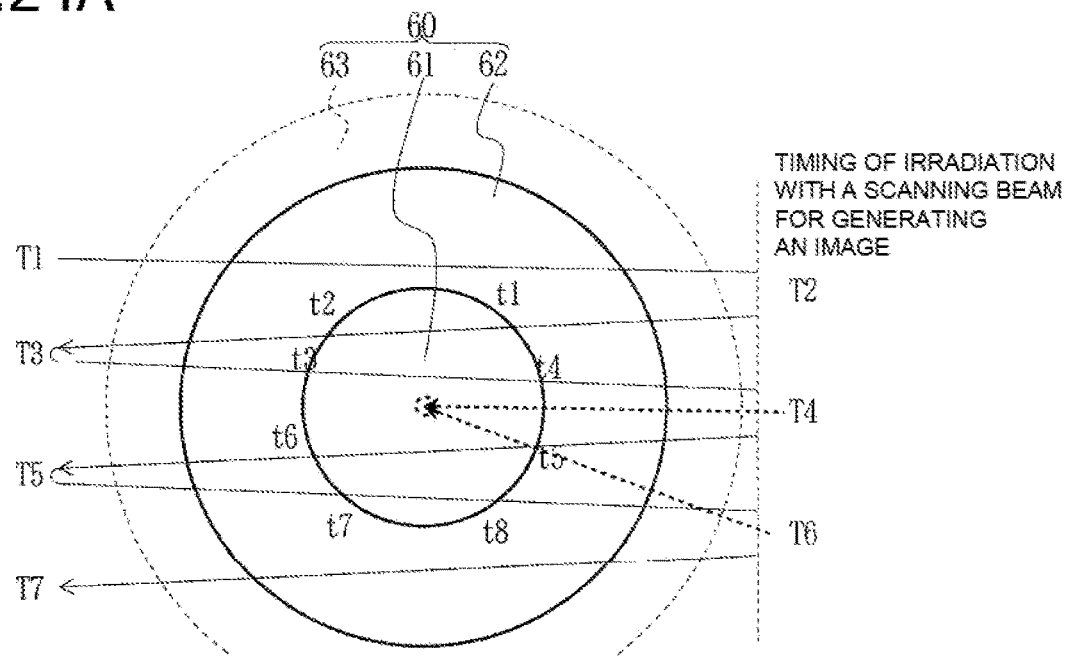
FIGS. 24A and 24B are diagrams and a graph illustrating the image generating method where the image generating device according to Example 13 of the present invention is used.
Figure 24B:
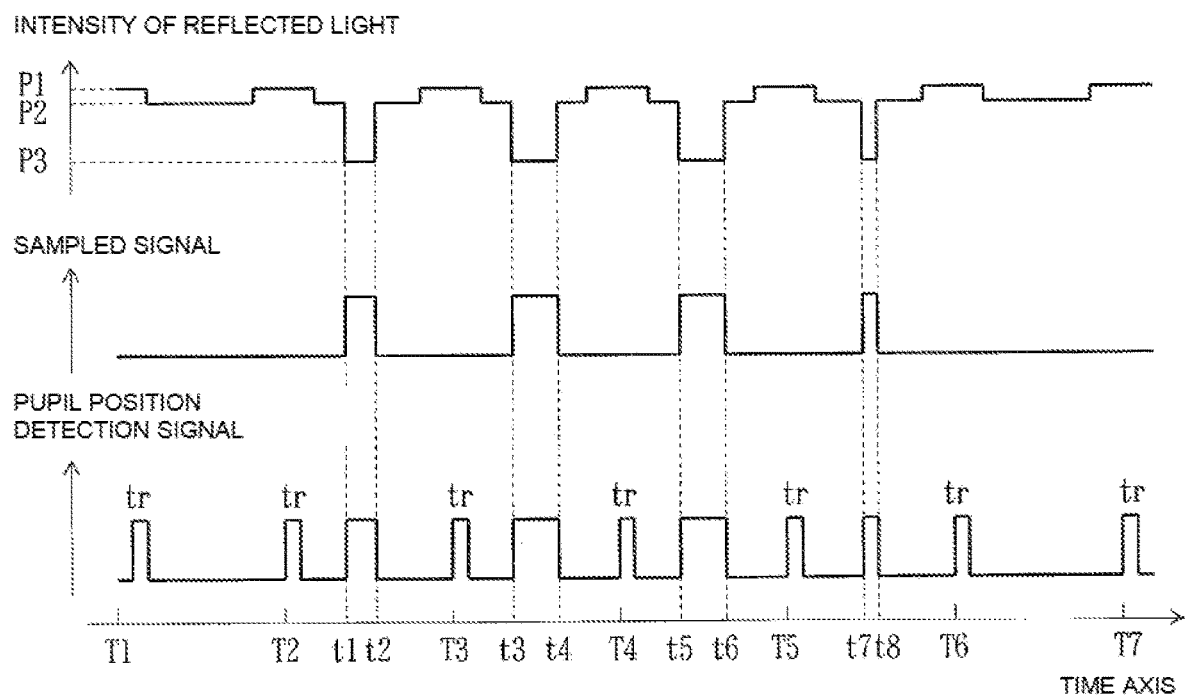

Next, the image generating device according to Example 13 of the present invention is described in reference to FIGS. 23 through 24B. The configuration of this device is the same as the above-described device in Example 1, and therefore, only the image generating method using the image generating device is described. In Example 13 of the present invention, scanning for detecting the pupil position and scanning for generating an image are carried out in accordance with the same timing through sequential scanning.

FIG. 23 is a diagram illustrating the state of irradiation with a scanning light beam in Example 13 of the present invention, which is the same state of irradiation with a light scanning beam as Example 1 illustrated in FIG. 6. The scanning light beam 52 emitted from the optical engine 30 is reflected from the holographic reflection plate 70 for the scanning of the surface of the eyeball 60 that includes a pupil 61. The reflected light is again reflected from the holographic reflection plate 70 so as to be detected by the photodetector (51) that is attached to the temple of the eyeglasses, and thus, the position of the pupil 61 is detected. The scanning is carried out with the three primary color beam 54 that has been emitted from the same optical engine 30, and then, the three primary color beam 54 is reflected from a holographic reflection plate (not shown), which is formed outside the range of the reflection plate for the scanning light beam 52 for detecting the pupil position in the eyeglasses lens 22, so as to pass through the pupil 61 so that an image is generated on the retina 64 of the eyeball 60.

The beam scanning for tracking and detecting a pupil is carried out with an increased range of an angle for scanning in accordance with the same timing as the beam scanning for generating an image. In this case, a light beam that is gained by thinning out all the three primary color light beams 54 for generating an image can be used as the scanning light beam 52 for tracking and detecting a pupil that is actually used for the scanning for detection, and thus, the time for running a program for the position analysis and the power consumption can be reduced. Concretely, the beam scanning for tracking and detecting a pupil may be 1 Hz to 100 Hz for the scanning both in the lateral and vertical directions in the case where the beam scanning for generating an image is 30 kHz for the scanning in the lateral (left to right) direction and 60 Hz for the scanning in the vertical (upward and downward) direction. Here, it is not originally desirable for the visible light used for the beam scanning for tracking and detecting a pupil to enter into the pupil 61, and therefore, the output of the scanning light beam 52 is made as low as possible at the time of beam scanning for tracking and detecting a pupil.

FIGS. 24A and 24B are a diagram and a graph illustrating the pupil position detection method where the pupil position detection device according to Example 13 of the present invention is used. FIG. 24A is a diagram illustrating the pupil position detection method, and FIG. 24B is a graph illustrating the image generating method As illustrated in FIG. 24A, the pupil 61, the iris 62 and the white of the eye 63 around these are irradiated with the light beam 53 while scanning the area that includes these. Here, the size of the pupil is approximately 2.5 mm to 4 mm in diameter, the width of the scanning with the scanning light beam is approximately +/−20 mm in the left to right direction and approximately +/−12 mm in the upward and downward direction. This setting of the scanning width makes it possible to detect the precise position of the pupil 61 when the position of the pupil 61 is changed by approximately +/−10 mm in the left to right direction and by approximately +/−5 mm in the upward and downward direction.

As illustrated in the upper part of FIG. 24B, as for the intensity of the reflected light detected by the photodetector 51, the reflected light P1 from the white of the eye 63 is the most intense, the reflected light P2 from the iris 62 is the second most intense, and the reflected light P3 from the pupil 61 is the least intense. The middle part of FIG. 24B illustrates a signal that covers time zones where the signal P3 sampled by using a signal level selector circuit can be gained. The time zones where the signal P3 can be gained are between t1 and t2, between t3 and t4, between t5 and t6, and between t7 and t8. The pupil 61 is irradiated with the scanning light beam 52 only during these time intervals.

In order to detect the position of the pupil 61 from these signals, like tr illustrated in the lower part of FIG. 24B, a short signal is generated as a trigger in the respective time slots that correspond to the respective points at which the scanning returns, and the time difference vis-à-vis the trigger is measured so that the position of the pupil 61 is determined by backwardly calculating from the time difference. For example, in the beam scanning between T2 and T3, the pupil 61 starts from the amount of change in the position that corresponds to the time between T2 and t1, and the amount of change in the position that corresponds to the time between t1 and t2 corresponds to the width of the pupil 61.

Accordingly, the detected position of the pupil 61 is irradiated with the light beam for generating an image between t3 and t4 and between t7 and t8, which are between the pupil position windows, that is to say, during the time of scanning in accordance with the timing of T4 and T6 after the pupil position has been detected. Here, the pupil position is not detected at the point in time T2, and therefore, the position is not irradiated with the light beam for generating an image. Here, the size of the spot for the beam for generating an image is smaller than approximately 4 mm in diameter.

In Example 13 of the present invention, a scanning light beam is used for detecting the pupil position, and therefore, the position of the pupil 61 can be detected almost in real time with a simple mechanism and a simple method. In addition, scanning is carried out with the three primary color light beams 54 for generating an image during the pupil position windows, and therefore, it becomes possible to reduce blurring of the optical system and the consumption of energy for controlling and driving the optical system.

Example 14

Figure 25:
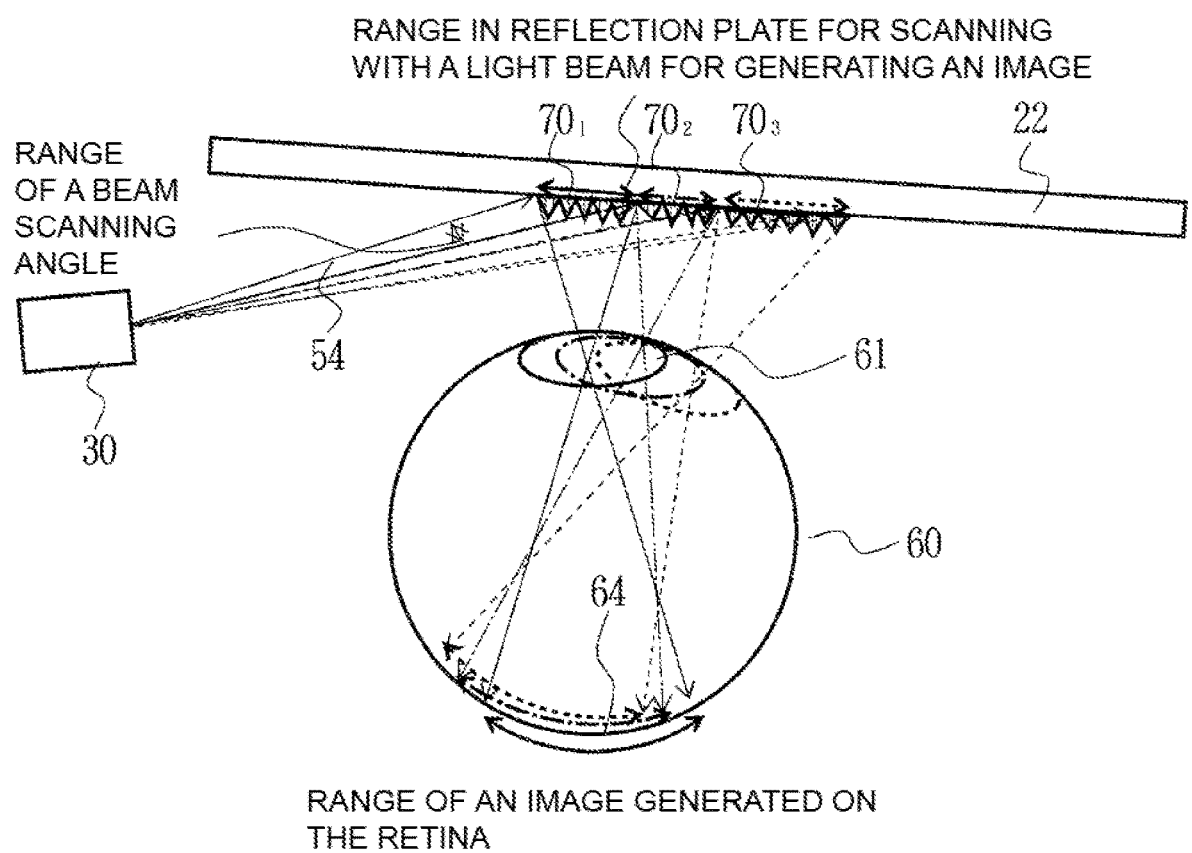
FIG. 25 is a diagram illustrating the image generating method in a system of a plurality of beam spots according to Example 14 of the present invention.

Next, the image generating method by means of a system with a plurality of beam spots according to Example 14 of the present invention is described in reference to FIG. 25. FIG. 25 is a diagram illustrating the image generating method by means of a system with a plurality of beam spots according to Example 14 of the present invention. This diagram illustrates the size and the position of the spots of the beam for generating an image on the pupil that are required to project a normal image onto the retina without blurring the image in the case where the position of the pupil 61 is changed (in the case where the pupil is moved). This example illustrates three positions that are irradiated with beam spots; however, the number of beam spots is arbitrary.

In Example 14 of the present invention, the holographic reflection plate 70 is divided into three regions $70_1$, $70_2$ and $70_3$, and the pitch of the diffraction grating is individually set in each region so that the preset position of the pupil 61 is irradiated with the reflected light.

A set region is scanned with a three primary color beam 54 emitted from the optical engine 30, for example, in a range of an angle for beam scanning that corresponds to the region $70_1$. Next, the beam is converged on a spot on the pupil 61 by means of the holographic reflection plate 70 so that an image is generated on the retina 64. In the case where the position of the pupil 61 has moved (change in the pupil position first denoted by a solid line, then a broken line, and finally a single-dotted chain line), the three primary color light beams emitted from the optical engine 30 (denoted by the types of lines that correspond to the types of lines of the moved pupil) are reflected from different regions $70_2$ and $70_3$ on the holographic reflection plate so as to guide the three primary color light beams 54 to the respective positions of the spots that are contained in the moved pupil 61, and thus, an image is generated in the ranges for the generated image on the retina 64 that are denoted by the types of lines corresponding to the types of lines of the moved pupil 61. Here, the scanning is carried out with the three primary color light beams 54 emitted from the optical engine 30 as follows.

(1) The scanning is carried out with the beams that are emitted from the respective beam emitting positions that are denoted by the solid line, the single-dotted chain line and the broken line in the figure only in the ranges of an angle for scanning that correspond to the three regions $70_1$, $70_2$ and $70_3$.

(2) The scanning may be carried out with a wide angle for beam scanning that covers all the ranges of an angle for scanning the beams that are emitted from the respective beam emitting positions denoted by the solid line, the single-dotted chain line and the broken line in the figure, and signals for an image are emitted only for the ranges of an angle for scanning with the beams that are emitted from the respective beam emitting positions denoted by the solid line, the single-dotted chain line and the broken line that correspond to the three regions $70_1$, $70_2$ and $70_3$.

(3) The scanning may be carried out with a wide range that covers all the ranges of an angle for scanning with the beams that are emitted from the respective beam emitting positions denoted by the solid line, the single-dotted chain line and the broken line in the figure that correspond to the three regions $70_1$, $70_2$ and $70_3$, and a signal for an image is emitted for the entirety of the wide range. Here, the signals of the beams that are emitted from the respective beam emitting positions that are denoted by the solid line, the single-dotted chain line and the broken line are modified so that the image does not blur on the retina. From among these, the methods (1) and (2) have advantageous points where the time during which an image signal is emitted is short and the consumption of power for generating an image is low. Here, in the same manner as in FIG. 6, the region of the holographic reflection plate excluding the range of the reflection plate for the scanning with the beams for generating an image is used for the scanning with the beams for detecting the pupil position, and thus, the position and the size of the pupil 61 are detected in advance through the scanning with the scanning light beam for detecting the pupil position.

Example 15

Figure 26:
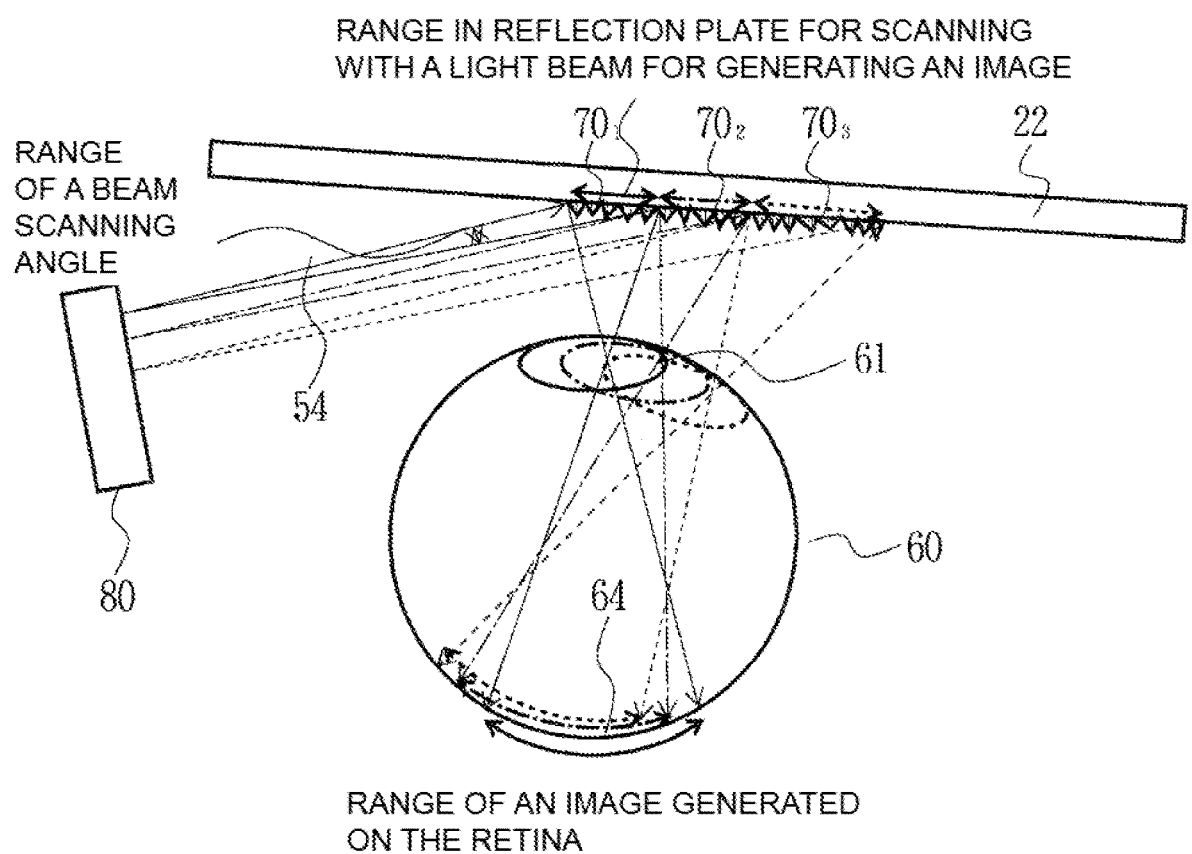
FIG. 26 is a diagram illustrating the image generating method in a system of a plurality of beam spots according to Example 15 of the present invention.

Next, the image generating method by means of a system with a plurality of beam spots according to Example 15 of the present invention is described in reference to FIG. 26. FIG. 26 is a diagram illustrating the image generating method by means of a system with a plurality of beam spots according to Example 14 of the present invention. This diagram illustrates the size and the position of the spots of the beam for generating an image on the pupil that are required to project a normal image onto the retina without blurring the image in the case where the position of the pupil 61 is changed (in the case where the pupil is moved). This example illustrates three positions that are irradiated with beam spots; however, the number of beam spots is arbitrary. Here, the optical engine used for the image generating method by means of a system with a plurality of beam spots according to Example 15 of the present invention is the same as the above-described optical engine in Example 7, and is moved in three stages by means of a module (83) for a moving mechanism.

In Example 15 of the present invention as well, the holographic reflection plate 70 is divided into three regions $70_1$, $70_2$ and $70_3$, and the pitch of the diffraction grating is individually set in each region so that the preset position of the pupil 61 is irradiated with the reflected light.

A three primary color beam 54 emitted from the optical engine 80 is outputted from the three preset beam outputting positions, and a set region is scanned with these outputted beams, for example, in a range of an angle for beam scanning that corresponds to the region $70_1$. Next, the beam is converged on a spot on the pupil 61 by means of the holographic reflection plate 70 so that an image is generated on the retina 64. In the case where the position of the pupil 61 has moved (change in the pupil position first denoted by a solid line, then a broken line, and finally a single-dotted chain line), the three primary color light beams emitted from the optical engine 80 (denoted by the types of lines that correspond to the types of lines of the moved pupil) are reflected from different regions 70₂ and 70₃ on the holographic reflection plate so as to guide the three primary color light beams 54 to the respective positions of the spots that are contained in the moved pupil 61, and thus, an image is generated in the ranges for the generated image on the retina 64 that are denoted by the types of lines corresponding to the types of lines of the moved pupil 61. Here, the scanning is carried out with the three primary color light beams 54 emitted from the optical engine 80 as follows.

(1) The scanning is carried out with the beams that are emitted from the respective beam emitting positions that are denoted by the solid line, the single-dotted chain line and the broken line in the figure only in the ranges of an angle for scanning that correspond to the three regions 70₁, 70₂ and 70₃.

(2) The scanning may be carried out with a wide angle for beam scanning that covers all the ranges of an angle for scanning the beams that are emitted from the respective beam emitting positions denoted by the solid line, the single-dotted chain line and the broken line in the figure, and signals for an image are emitted only for the ranges of an angle for scanning with the beams that are emitted from the respective beam emitting positions denoted by the solid line, the single-dotted chain line and the broken line that correspond to the three regions 70₁, 70₂ and 70₃.

(3) The scanning may be carried out with a wide range that covers all the ranges of an angle for scanning with the beams that are emitted from the respective beam emitting positions denoted by the solid line, the single-dotted chain line and the broken line in the figure that correspond to the three regions 701, 702 and 703, and a signal for an image is emitted for the entirety of the wide range. Here, the signals of the beams that are emitted from the respective beam emitting positions that are denoted by the solid line, the single-dotted chain line and the broken line are modified so that the image does not blur on the retina. From among these, the methods (1) and (2) have advantageous points where the time during which an image signal is emitted is short and the consumption of power for generating an image is low. Here, in the same manner as in FIG. 6, the region of the holographic reflection plate excluding the range of the reflection plate for the scanning with the beams for generating an image is used for the scanning with the beams for detecting the pupil position, and thus, the position and the size of the pupil 61 are detected in advance through the scanning with the scanning light beam for detecting the pupil position.

Here, the following additional remarks are attached concerning the embodiments of the present invention that include Example 1 through Example 15.

(1) An image generating device, comprising: a light source; a light scanning mirror for scanning with light from the light source; a measurement mechanism for measuring a change in the intensity of light reflected from an eyeball as time elapses through the scanning of at least a surface of the pupil with a light beam by means of the light scanning mirror; a sampling mechanism for sampling the intensity of light reflected from the pupil from the measured change in the intensity of the reflected light as time elapses; and a mechanism for detecting the size and the position of the pupil by synchronizing the sampled intensity of light reflected from the pupil, and the scanning time during which the surface of the eyeball is scanned; and an image generating mechanism for forming an image on the retina of the eyeball by projecting a light beam for generating an image onto the pupil in the detected position while scanning.

(2) The image generating device according to (1), wherein a light path switching element for switching the light path for the light beam for the scanning by means of the light scanning mirror between the time of scanning for the detection of the pupil position and the time of scanning with the light beam for generating an image is provided on the output side of the light scanning mirror.

(3) The image generating device according to (1) or (2), wherein the pupil position detection mechanism has a reflection member from which the light beam for the scanning by means of the light scanning mirror is reflected towards at least the pupil.

(4) The image generating device according to any of (1) through (3), wherein the surface of the eyeball that contains the pupil and the iris is scanned with the light beam by means of the light scanning mirror.

(5) The image generating device according to (3), wherein the light source, the light scanning mirror and the reflection member for a light beam for generating an image in the image generating mechanism also function as a light source, a light scanning mirror and a reflection member in the pupil position detection mechanism.

(6) The image generating device according to (4) or (5), wherein the reflection member is a holographic reflection plate.

(7) The image generating device according to (6), wherein the holographic reflection plate is provided at least on a rim of the eyeglasses or on a lens of the eyeglasses.

(8) The image generating device according to (6) or (7), wherein the holographic reflection plate is directly irradiated with the light beam with which a surface of the eyeball is to be scanned.

(9) The image generating device according to (6), wherein the light beam with which the surface of the eyeball is to be scanned propagates through the rim of the eyeglasses or the inside of the lens of the eyeglasses so as to be reflected from the holographic reflection plate that is provided on the rim of the eyeglasses or on the surface of the lens of the eyeglasses on the side opposite the eyeball.

(10) The image generating device according to any of (1) through (9), wherein the light scanning mirror in the image generating mechanism is provided with a moving mechanism that is movable in the direction along the optical axis of the light beam emitted from the light source of the image generating mechanism.

(11) The image generating device according to any of (1) through (10), wherein the light source includes one or more types of semiconductor laser chips from among a blue semiconductor laser chip, a green semiconductor laser chip, a red semiconductor laser chip, a yellow semiconductor laser chip, an infrared ray semiconductor laser chip and an ultraviolet ray semiconductor laser chip.

(12) An image generating method, comprising: scanning a surface of at least the pupil with a light beam; measuring a change in the intensity of light reflected from the pupil as time elapses; sampling the intensity of light reflected from the pupil from the measured change in the intensity of the reflected light as time elapses; detecting the size and the position of the pupil by synchronizing the sampled intensity of light reflected from the pupil and the scanning time during which the surface of the eyeball is scanned; and after that projecting an image while scanning the pupil with a light beam for generating an image in the detected position of the pupil so as to form the image on the retina of the eyeball.

(13) The image generating method according to (12), wherein the step of detecting the size and the position of the pupil and the step of scanning with the light beam for generating an image are carried out separately timewise.

(14) The image generating method according to (12), wherein the step of detecting the size and the position of the pupil and the step of scanning with the light beam for generating an image are carried out in a sequential scanning process.

(15) The image generating method according to (13) or (14), wherein a reflection member is used to reflect towards at least the pupil a light beam for the scanning by means of a light scanning mirror when the surface of at least the pupil is scanned with the light beam.

(16) The image generating method according to (13) or (14), wherein a surface of the eyeball that includes the pupil and the iris is scanned with the light beam for the scanning by means of the light scanning mirror.

(17) The image generating method according to (16), wherein in the step of detecting the size and the position of the pupil, a plurality of beam spots that are irradiated with a light beam for generating an image are preset on the eyeball and are irradiated with the light beam for the scanning, and an image is projected onto one of the plurality of beam spots that has been detected as being in the vicinity of the center position of the pupil while scanning with the light beam for generating an image.

(18) The image generating method according to (17), wherein an image is projected onto each beam spot from among the plurality of beam spots during scanning with the light beam for generating an image while the scanning angle of the light beam is being changed by means of the light scanning mirror for the scanning with the light beam for generating an image.

(19) The image generating method according to (17), wherein an image is projected onto each beam spot from among the plurality of beam spots during scanning with the light beam for generating an image while the light scanning mirror for the scanning with the light beam for generating an image is being moved in the direction along the optical axis of the light beam emitted from the light source.

(20) The image generating method according to (12), wherein an image is projected during scanning while the position that is irradiated with the light beam for generating an image is continuously being changed with the beam spot that has been detected as being in the center position of the pupil being in the center position.

(21) The image generating method according to (20), wherein a beam spot is formed of the emitted light beam in a position inside the eyeball when the light beam passes through the pupil.

(22) The image generating method according to any of (17) through (21), wherein an image is projected onto each beam spot on which a scanning operation is carried out within a predetermined range of a beam scanning angle while scanning with the light beam for generating an image within the preset range of the beam scanning angle.

(23) The image generating method according to any of (17) through (21), wherein an image is projected onto each beam spot on which a scanning operation is carried out beyond a predetermined range of a beam scanning angle while scanning with the light beam for generating an image within the preset range of the beam scanning angle.

(24) The image generating method according to any of (17) through (21), wherein an image is projected onto each beam spot while scanning with the light beam for generating an image beyond the predetermined range of the beam scanning angle.

(25) A pupil position detection device, comprising: a light source; a light scanning mirror for scanning with light from the light source; a measurement mechanism for measuring a change in the intensity of light reflected from an eyeball as time elapses through the scanning of at least a surface of the pupil with a light beam by means of the light scanning mirror; a sampling mechanism for sampling the intensity of light reflected from the pupil from the measured change in the intensity of the reflected light as time elapses; and a mechanism for detecting the size and the position of the pupil by synchronizing the sampled intensity of light reflected from the pupil, and the scanning time during which the surface of the eyeball is scanned.

(26) The pupil position detection device according to (25), further comprising a reflection member from which the light beam for the scanning by means of the light scanning mirror is reflected towards at least the pupil.

(27) The pupil position detection device according to (25) or (26), wherein the surface of the eyeball that contains the pupil and the iris is scanned with the light beam by means of the light scanning mirror.

(28) A pupil position detection method, comprising: scanning a surface of at least the pupil with a light beam; measuring a change in the intensity of light reflected from the pupil as time elapses; sampling the intensity of light reflected from the pupil from the measured change in the intensity of the reflected light as time elapses; and detecting the size and the position of the pupil by synchronizing the sampled intensity of light reflected from the pupil and the scanning time during which the surface of the eyeball is scanned.

(29) The pupil position detection method according to (28), wherein a reflection member is used to reflect towards at least the pupil a light beam for the scanning by means of a light scanning mirror when the surface of at least the pupil is scanned with the light beam.

(30) The pupil position detection method according to (28), wherein a surface of the eyeball that includes the pupil and the iris is scanned with the light beam for the scanning by means of the light scanning mirror.

REFERENCE SIGNS LIST 1 optical engine
2 light source
3 light scanning mirror
4 light beam
5 support member
6 reflection member
7 eyeball
8 pupil
9 iris
10 retina
11 measurement mechanism
12 white of the eye
13 light beam for generating an image
20 eyeglasses
21 temple
22 eyeglasses lens
23 bridge
30, 55, 80, 90 optical engine
31, 43 Si substrate
32, 37 $SiO_2$ film
33 optical multiplexer 34 through 36 patterned light waveguide
38, 44 two-dimensional light scanning mirror unit
39 red semiconductor laser chip
40 green semiconductor laser chip
41 blue semiconductor laser chip
42 solenoid coil
51 photodetector
52 scanning light beam
53 reflected light
54 three primary color light beam
55 light path switching element
60 eyeball
61 pupil
62 iris
63 white of the eye
64 retina
$66_1$ through $66_5$ beam spot for generating an image
70 holographic reflection plate
$70_1, 70_2, 70_3$ region
71 substrate
72 plastic film
73 mold
74 diffraction grating
81 common substrate
82 movement guide
83 module for a movement mechanism
84 movement bar

The invention claimed is:

1. An image generating device, comprising:
a light source;
a light scanning mirror for scanning with light from the light source;
a measurement mechanism for measuring a change in the intensity of light reflected from an eyeball as time elapses through the scanning of at least a surface of a pupil with a light beam by means of the light scanning mirror;
a sampling mechanism for sampling the intensity of light reflected from the pupil from the measured change in the intensity of the reflected light as time elapses; and
a detection mechanism for detecting a size and a position of the pupil by synchronizing the sampled intensity of light reflected from the pupil, and the scanning time during which a surface of the eyeball is scanned; and
an image generating mechanism for forming an image on a retina of the eyeball by projecting the light beam for generating an image onto the pupil in the detected position while scanning,
wherein the surface of the eyeball that contains the pupil and an iris is scanned with the light beam by the light scanning mirror, and
wherein in the detection mechanism for detecting the size and the position of the pupil, a plurality of beam spots that are irradiated with the light beam for generating the image are preset on the eyeball and are irradiated with the light beam for the scanning, and the image is projected onto one of the plurality of beam spots that has been detected as being in the vicinity of a center position of the pupil while scanning with the light beam for generating the image.

2. The image generating device according to claim 1, wherein the detection mechanism has a reflection member from which the light beam for the scanning by means of the light scanning mirror is reflected towards at least the pupil.

3. The image generating device according to claim 2, wherein the light source, the light scanning mirror and the reflection member for the light beam for generating the image in the image generating mechanism also function as the light source, the light scanning mirror and the reflection member in the detection mechanism.

4. The image generating device according to claim 2, wherein the reflection member is a holographic reflection plate.

5. The image generating device according to claim 4, wherein the holographic reflection plate is provided at least on a rim of the eyeglasses or on a lens of the eyeglasses.

6. The image generating device according to claim 4, wherein the holographic reflection plate is directly irradiated with the light beam with which the surface of the eyeball is to be scanned.

7. The image generating device according to claim 4, wherein the light beam with which the surface of the eyeball is to be scanned propagates through a rim of the eyeglasses or the inside of the lens of the eyeglasses so as to be reflected from the holographic reflection plate that is provided on the rim of the eyeglasses or on the surface of the lens of the eyeglasses on the side opposite the eyeball.

8. The image generating device according to claim 1, wherein the light scanning mirror in the image generating mechanism is provided with a moving mechanism that is movable in the direction along an optical axis of the light beam emitted from the light source of the image generating mechanism.

9. The image generating device according to claim 1, wherein the light source includes one or more types of semiconductor laser chips from among a blue semiconductor laser chip, a green semiconductor laser chip, a red semiconductor laser chip, a yellow semiconductor laser chip, an infrared ray semiconductor laser chip and an ultraviolet ray semiconductor laser chip.

10. An image generating method, comprising:
scanning a surface of at least a pupil with a light beam;
measuring a change in the intensity of light reflected from the pupil as time elapses;
sampling the intensity of light reflected from the pupil from the measured change in the intensity of the reflected light as time elapses;
detecting a size and a position of the pupil by synchronizing the sampled intensity of light reflected from the pupil and the scanning time during which a surface of an eyeball is scanned; and after that
projecting an image while scanning the pupil with the light beam for generating an image in the detected position of the pupil so as to form the image on a retina of the eyeball,
wherein the surface of the eyeball that includes the pupil and an iris is scanned with the light beam for the scanning by means of a light scanning mirror, and
wherein in the step of detecting the size and the position of the pupil, a plurality of beam spots that are irradiated with the light beam for generating the image are preset on the eyeball and are irradiated with the light beam for the scanning, and the image is projected onto one of the plurality of beam spots that has been detected as being in the vicinity of a center position of the pupil while scanning with the light beam for generating the image.

11. The image generating method according to claim 10, wherein a reflection member is used to reflect towards at least the pupil the light beam for the scanning by means of the light scanning mirror when the surface of at least the pupil is scanned with the light beam.

12. The image generating method according to claim 10, wherein the image is projected onto each beam spot from among the plurality of beam spots during scanning with the light beam for generating the image while a scanning angle of the light beam is being changed by means of the light scanning mirror for the scanning with the light beam for generating the image.

13. The image generating method according to claim 10, wherein the image is projected onto each beam spot from among the plurality of beam spots during scanning with the light beam for generating the image while the light scanning mirror for the scanning with the light beam for generating the image is being moved in a direction along an optical axis of the light beam emitted from a light source.

14. The image generating method according to claim 10, wherein the image is projected during scanning while the position that is irradiated with the light beam for generating the image is continuously being changed with the beam spot that has been detected as being in the center position of the pupil being in the center position.

15. The image generating method according to claim 14, wherein the beam spot is formed of the emitted light beam in a position inside the eyeball when the light beam passes through the pupil.

16. The image generating method according to claim 10, wherein the image is projected onto each beam spot on which a scanning operation is carried out within a predetermined range of a beam scanning angle while scanning with the light beam for generating the image within the predetermined range of the beam scanning angle.

17. The image generating method according to claim 10, wherein the image is projected onto each beam spot on which a scanning operation is carried out beyond a predetermined range of a beam scanning angle while scanning with the light beam for generating an image within the predetermined range of the beam scanning angle.

18. The image generating method according to claim 10, wherein the image is projected onto each beam spot while scanning with the light beam for generating the image beyond a predetermined range of a beam scanning angle.

* * * * *